United States Patent [19]
Senjo

[11] Patent Number: 6,027,288
[45] Date of Patent: Feb. 22, 2000

[54] WORKING APPARATUS FOR CHAMFERING WORKPIECES

[75] Inventor: Motohiro Senjo, Shizuoka, Japan

[73] Assignee: Senjo Seiki Corporation, Shizuoka, Japan

[21] Appl. No.: 09/003,121

[22] Filed: Jan. 6, 1998

[30] Foreign Application Priority Data

Jan. 9, 1997 [JP] Japan .................................. 9-013415
Mar. 6, 1997 [JP] Japan .................................. 9-069090

[51] Int. Cl.[7] .................................................. B23C 1/06
[52] U.S. Cl. ........................ 409/138; 409/165; 409/199
[58] Field of Search .................................. 409/138, 139, 409/140, 165, 166, 175, 178, 179, 180, 184, 191, 197, 199; 144/154.5

[56] References Cited

U.S. PATENT DOCUMENTS

| | | | |
|---|---|---|---|
| 2,935,102 | 5/1960 | Potter .................................. | 144/154.5 |
| 3,442,309 | 5/1969 | Jentsch ................................. | 409/178 |
| 3,494,394 | 2/1970 | Stock .................................... | 144/154.5 |
| 3,517,712 | 6/1970 | Selowitz .............................. | 409/178 |
| 3,880,048 | 4/1975 | Zimmerman ........................ | 409/97 |
| 4,601,619 | 7/1986 | Stinnett .............................. | 409/180 |
| 4,637,775 | 1/1987 | Kato ...................................... | 409/138 |
| 4,787,786 | 11/1988 | Freud et al. ......................... | 409/180 |
| 4,865,093 | 9/1989 | Ford et al. .......................... | 409/178 |
| 4,960,352 | 10/1990 | Kishi .................................... | 409/180 |
| 4,979,854 | 12/1990 | Kurita et al. ....................... | 409/138 |
| 4,985,982 | 1/1991 | Lohr et al. .......................... | 409/138 |
| 4,993,896 | 2/1991 | Dombrowski et al. ............. | 409/138 |

FOREIGN PATENT DOCUMENTS 5-200655  8/1993  Japan .

*Primary Examiner*—Daniel W. Howell
*Attorney, Agent, or Firm*—Whitham, Curtis & Whitham

[57] ABSTRACT

A working apparatus comprising, a base, a work piece supporting and rotating means on the base to hold and rotate a work piece, a working tool unit on the base to hold a working tool to be rotatable and which forwardly and rearwardly moves in horizontal direction toward the work piece via a slider mechanism, a pressing means to press the working tool unit in horizontal direction at a constant pressing force toward the work piece, and a profiling means on the working tool unit to forwardly and rearwardly move by profiling an outer periphery of the work piece through being in contact with the work piece in horizontal direction and thereby to move the whole working tool unit in forward and rearward directions.

13 Claims, 21 Drawing Sheets

WORKING APPARATUS FOR CHAMFERING WORKPIECES

BACKGROUND OF THE INVENTION

1. Field of the Invention

The present invention relates to a working apparatus which applies machining or working against, for example, industrial parts having a common character (hereinafter referred to as "work piece") worked by machine tool, or against any other work pieces manufactured by die-cast injection molding, punching press, lost wax casting, closed die forging, etc., so as to chamfer according to the contour, or to finish the outer peripheral end surface to be a prescribed accuracy of working. More particularly, the present invention relates to a working apparatus which may apply a desired machining or working to the work piece without requiring complicated control or structure.

2. Description of the Related Art

FIG. 20 shows an example of work piece manufactured through machining or working by machine tool, die-cast injection molding, punching press, lost wax casting, closed die forging, etc. A work piece 201 in FIG. 20 has somewhat a complicated two-dimensional shape because of combination or linear lines and curved lines. The work piece 201 has a flange-shaped form, in which a penetration hole 203 is formed through which an unillustrated shaft penetrates. The work piece 201 also has other penetration holes 205 at the four corners thereof in which unillustrated clamp screws are inserted. In addition, a ring depression 207 is formed around the outer periphery of the penetration hole 203, and the ring depression 207 has a plurality of protrusions 209. The thus described structure of the work piece 201 is engaged with or fixed on other unillustrated work pieces to be finished as a predetermined device.

In regard to the work piece 201 as shown in FIG. 20, although the accuracy of dimension is severely required as for pitches P1 or P2 between the penetration holes 205 and 205, it is rather unimportant to obtain an absolute accuracy as for the contour thereof.

It is necessary to remove rough part on edges of the outer periphery resulting from manufacturing process, namely burr. It is also necessary to chamfer according to the contour or to finish the end surface to be a prescribed accuracy of working. At that time, if a mere removal of burr is to be made, it is sufficient to use flexible tools such as brushing wheel or wire wheel. However, if the chamfering according to the contour, or the finishing of the end surface, should be carried out under a prescribed accuracy of working, it is necessary to use any cutting tool such as end mill, rotary bar, chamfer cutter, etc.

FIGS. 21 and 22 show examples of cutting apparatuses for finishing by using the above cutting tools. There is a base 301, on which an index table apparatus 303 is mounted. A work piece 305 as an object to be cut is placed on this index table apparatus 303, and is clamped by a air-cylinder type of clamp unit 307 provided above the work piece 305.

There is a slide table 309 provided on the base 301, and the slide table 309 forwardly and rearwardly moves in the direction of the work piece 305 by an air cylinder 311. As illustrated in FIG. 22, there is a coil spring 313 attached on the base end of the slide table 309. The slide table 309 also has a cutter driving unit 315 at the top thereof, and a rotary bar 317 is attached on the top of the cutter driving unit 315. The rotary bar 317 performs cutting by being pressed onto the outer periphery of the rotating work piece 305.

For reference, a predetermined pressing force is applied to the rotary bar 317 during being pressed onto the work piece 305 by means of the coil spring 313.

The index table apparatus 303 has a work piece-shaped model cam 319 mounted on the bottom thereof, and there is also a stylus roller 323 mounted on the side of the slide table 309 via an arm 321. When the index table apparatus 303 rotates, the work piece-shaped model cam 319 also rotates, thereby the slide table 309 forwardly and rearwardly moves along the contour of the work piece-shaped model cam 319 via the stylus roller 323. In such a structure, the positioning of the rotary bar 317 against the work piece 305 is controlled, thus the work piece 305 is cut according to the contour of the work piece-shaped model cam 319.

For further explanation, reference numeral 331 is a control board, and 333 is a chamfering amount adjusting knob.

There is another example of cutting apparatus as illustrated in FIGS. 23 and 24. There is a base 401, on which an X/Y servo slide unit 403 is mounted. As illustrated in FIG. 24, the X/Y servo slide unit 403 comprises an X-axis slider 405 and a Y-axis slider 407, and the Y-axis slider 407 is provided with a cutter driving unit 408. The cutter driving unit 408 has an end mill 409 at the top thereof.

The Y-axis slider 407 moves in the X-axial direction by means of the X-axis slider 405, and the cutter driving unit 408 moves in the Y-axial direction by means of the Y-axis slider 407. Therefore the cutter driving unit 408 may move both in the X and Y directions so as to move to an arbitrary coordinate (X/Y) position.

The base 401 is further provided, for example a three-claw type of air chuck 411 thereon, and a work piece 413 is placed and fixed on this three-claw type of air chuck 411. Further, a control board 415 and a servo slide unit controller 417 are provided in the upper section above the base 401. In addition, as illustrated in FIG. 24, a cutting oil nozzle 419 and an air blowing nozzle 421 are provided in the cutting apparatus which uses the end mill 409, to which cutting oil and compressed air are respectively supplied. There are also various switches 423 such as an actuation switch or an emergency stop switch in the lower section above the base 401.

For further explanation, reference numeral 425 in FIG. 24 is a stopper for positioning of the work piece 413.

In the thus described structure, the work piece 413 is held at the predetermined position by the three-claw type of air chuck 411. In addition, the tracking information of the end mill 409 has already been input and stored in a servo slide unit controller 417 via an unillustrated teaching box, etc. The tracking information is used for finish the work piece 413 according to a predetermined dimension and shape. Thus the control signal from the servo slide unit controller 417 actuates the X/Y servo slide unit 403, so that the end mill 409 may carry out the movement according to the predetermined track information, thereby a predetermined cutting is performed against the work piece 413.

However, the prior arts as above described have the following problems.

With regard to the work piece 201 illustrated in FIG. 20, as already discussed, the absolute accuracy of dimension of contour is not so important, and in fact there is a deviation of contours of the manufactured work pieces. For a large number of work pieces 201 having deviation of contours, it is necessary to remove the burr and to chamfer according to the contour, or to finish the end surface to be a prescribed accuracy of working.

When considering the prior arts of cutting apparatus from this point of view, every apparatus has a structure to carry out the uniform cutting against any of the work pieces 305 or 413 according to the work piece-shaped model cam 319 or to the tracking information set in advance based on the model work piece. Therefore, when there is a deviation of contour of the work piece 305 or 413, the depth of cutting may also deviate, which results in excessive amount or size of chamfering due to excessive depth of cutting at several positions, and in some case, results in damage to the tool. In addition, there may also be a case that the sufficient depth of cutting is not obtained to result in small amount or size of chamfering, which in the extreme condition causes the burr to partially remain without being removed. As above described, according to the prior arts relating to the cutting apparatus, there has been a problem that the deviation of the finished condition may occur due to deviation of contours of the work pieces.

Further, there is another problem of the difficult operation, especially for the cutting apparatus as shown in FIGS. 23 and 24. In regard to the cutting apparatus in FIGS. 23 and 24, as above described, it is necessary to input and store the tracking information in advance corresponding to the shape of the work piece. However, the input and store procedures should be done in practice by setting many programming points along the contour in order to determine the X/Y coordinates of these programming points, and the obtained programming points are then input and stored by using the teaching box. This kind of input and store procedures is not an easy operation at all, and whenever the type of work piece changes, the corresponding change of programming points is required. In addition, when the contour of work piece becomes more complicated, the number of programming points should be increased, which will require more difficult operation.

From this point of view, the applicant of the present invention has already invented "a following working apparatus" of which details are disclosed in Unexamined Japanese Patent Publication No. Hei 5-200655.

However, according to the "following working apparatus" as disclosed in Unexamined Japanese Patent Publication No. Hei 5-200655, the pressing force, which is applied to a working apparatus to pressingly be in contact with a work piece, is detected by a load sensor. Although such a structure of the "following working apparatus" has been simplified in total and hence a remarkable facile operation has been accomplished, the structure thereof is still complicated and expensive due to the control based on the detected amount by load sensor, or to the program control by servo motor.

SUMMARY OF THE INVENTION

It is an object of the present invention to provide a working apparatus which can apply a predetermined working against an arbitrary shape of work piece in a simple structure and by facile operation, without requiring any complicated and expensive control such as to use a load cell, etc.

To achieve the object mentioned above, according to claim 1 of the present invention, there is provided a working apparatus comprising, a base, a work piece supporting and rotating means mounted on the base to hold and rotate a work piece, a working tool unit mounted on the base to hold a working tool to be rotatable and which forwardly and rearwardly moves in horizontal direction toward the work piece via a slider mechanism, a pressing means to press the working tool unit in horizontal direction at a constant pressing force toward the work piece, and a profiling means provided on the working tool unit and forwardly and rearwardly moves by profiling an outer periphery of the work piece through being in contact with the work piece in horizontal direction and thereby moves the working tool unit as a whole in forward and rearward directions.

Preferably, the profiling means may be a profiling member attached to an end of the working tool with having a common axis.

Preferably, the profiling means may be a rotative profiling roller attached to an end of the working tool with having a common axis, or may be a bearing attached to an end of the working tool with having a common axis.

With this structure, the working tool unit may be provided with a tool base having a working tool to carry out a predetermined working on the work piece, and the profiling means may independently be attached to the tool base apart from the working tool.

Preferably, the profiling apparatus may comprise a supporting member elongated from the tool base, and a profiling member attached to an end of the supporting member.

Preferably, the profiling member may be a rotative profiling roller or a bearing attached to an end of the supporting member, or may be a rotative profiling belt in a loop shape attached to an end of the supporting member.

Further, the working apparatus may be provided with a working tool unit detecting means to maintain a constant cutting feed speed of the work piece through adjustment of a rotation speed of the work piece by the work piece holding and rotating means based on a signal from the working tool unit detecting means.

Preferably, the pressing means may be a spring-type elastic member or a weight.

Further, there is provided a working apparatus comprising, a base, a work piece supporting and rotating means mounted on the base to hold and rotate a work piece, a working tool unit mounted on the base to hold a working tool to be rotatable and which forwardly and rearwardly moves in perpendicular direction toward the work piece via a slider mechanism, and a profiling means provided on the working tool unit and forwardly and rearwardly moves by profiling an outer periphery of the work piece through being in contact with the work piece in perpendicular direction and thereby moves the working tool unit as a whole in forward and rearward directions.

Further, there is provided a working apparatus comprising, a base, a work piece supporting and rotating means mounted on the base to hold and rotate a work piece, a working tool unit mounted on said base to hold a working tool to be rotatable and which forwardly and rearwardly moves in horizontal and perpendicular directions toward the work piece via a slider mechanism, a pressing means to press the working tool unit in horizontal direction at a constant pressing force toward the work piece, a horizontal profiling means provided on the working tool unit and forwardly and rearwardly moves by profiling an outer periphery of the work piece through being in contact with the work piece in horizontal direction and thereby moves the working tool unit as a whole in horizontal forward and rearward directions, and a perpendicular profiling means provided on the working tool unit and forwardly and rearwardly moves by profiling an outer periphery of the work piece through being in contact with the work piece in perpendicular direction and thereby moves the working tool unit as a whole in perpendicular forward and rearward directions.

Namely, according to a working apparatus of the present invention, the profiling means profiles the contour of the rotating work piece, thereby the working tool unit is forwardly and rearwardly moved against the work piece. At the same time, the working tool unit maintains the state of being pressed toward the work piece by the pressing means at a constant pressing force. Therefore it is possible to carry out a predetermined working against an arbitrary shape of work piece by only mounting and fixing the work piece to be rotatable on the work piece holding and rotating means.

Accordingly, it is possible to carry out a desired chamfering or any other working against the work piece, in a simple structure, by simple operation, and without requiring the complicated and expensive control such as to use the load sensor. This is because the present invention has a structure that the pressing means makes the working tool unit press so as to be in constant contact with the work piece at a predetermined pressing force, and that the working tool unit forwardly and rearwardly moves by profiling the contour of the work piece through detection of the variation of the diameter of the outer periphery of the work piece by a profiling means.

As for the mounting and fixing position of the work piece on the work piece holding and rotating means, the position of the work piece has no limitation as long as such a position includes the center of rotation of the work piece holding and rotating means, and the working can be carried out from any position of the rotation direction of the work piece. Therefore the mounting and fixing procedures of the work piece become remarkably simple.

When the cutting feed speed of the work piece is arranged so as not to change due to variation of the contour of the work piece, the accuracy and efficiency of working may improve.

Further, against variation of the contour of the work piece in perpendicular direction, when the working tool unit is arranged so as to move up and down according to such a variation through detection by the profiling means, it is possible to carry out a predetermined working or machining at a constant chamfering amount (width), not only for the variation of the contour of the work piece in horizontal direction, but also for that in perpendicular direction.

BRIEF DESCRIPTION OF THE DRAWINGS

The invention will be described below in detail with reference to the accompanying drawings, in which.

DETAILED DESCRIPTION OF THE INVENTION (First Embodiment)

A first embodiment of the present invention will now be described with reference to FIGS. 1 through 9. Firstly, the overall structure of a working apparatus according to the first embodiment will be described with reference to FIGS. 1 and 2. There is a base 1, on which a work piece chuck unit 3 is mounted as a work piece holding and rotating means. Thus a work piece 5 (as expressed by virtual line in FIG. 2 and also by continuous line in FIG. 5) is mounted and fixed on the work piece chuck unit 3. The work piece chuck unit 3 is provided with a work piece rotation driving motor 7, which rotates the work piece 5 mounted and fixed on the work piece chuck unit 3.

Figure 2:
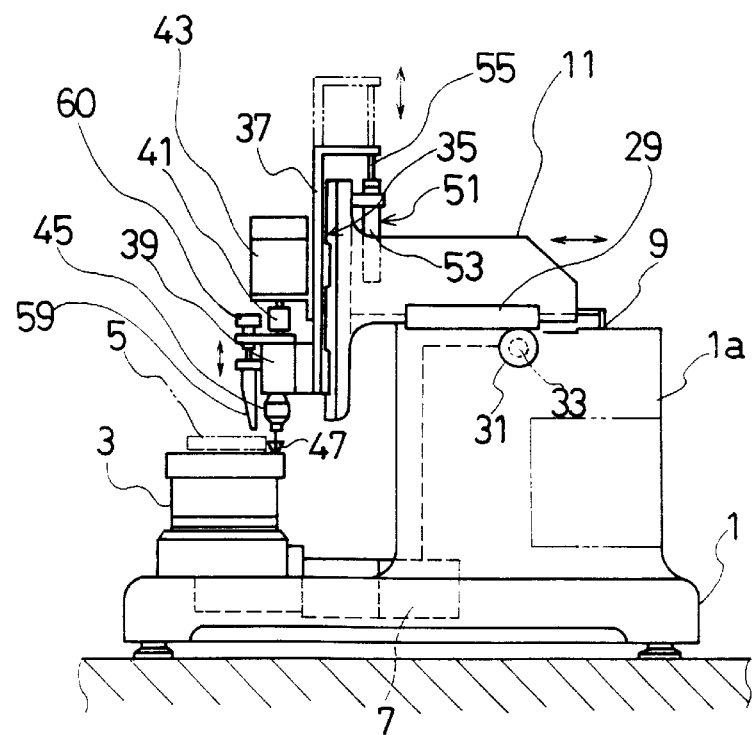
FIG. 2 is a side view showing an overall structure of the working apparatus according to the first embodiment of the present invention.

There is a protrusion 1a which protrudes from the right side of the base 1 as seen in FIG. 2, and a head 11 is mounted to be movable to the right and left of FIG. 2 on the protrusion 1a via a slider mechanism 9.

Figure 6:
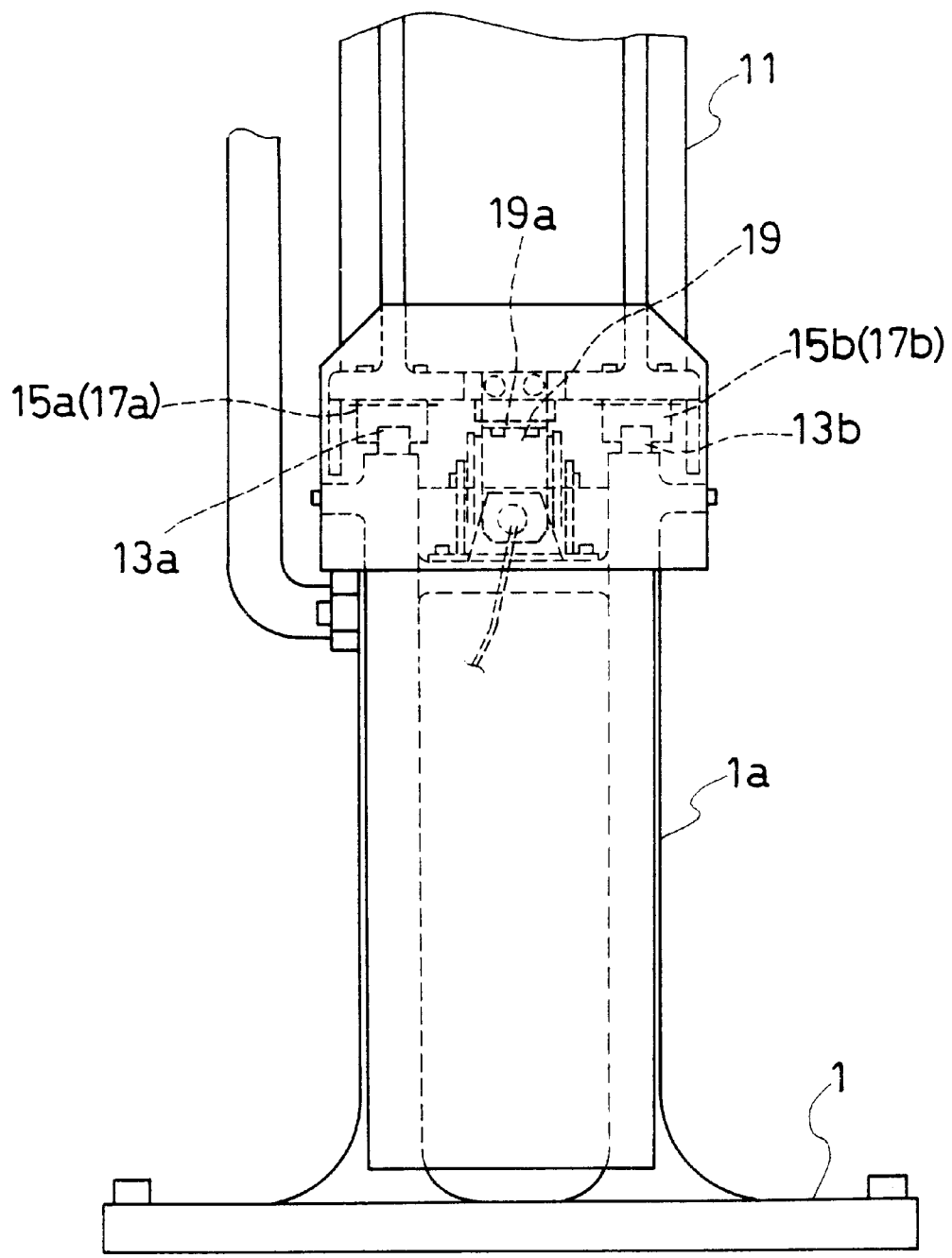
FIG. 6 is an expanded rear view showing a head of the working apparatus and a structure to move the head in forward and rearward directions according to the first embodiment of the present invention.

The detailed structure of the slider mechanism 9 is as illustrated in FIG. 6. There is a pair of rail members 13a and 13b laid on the side of the protrusion 1a. Further, there are guide members 15a, 15b, 17a and 17b mounted on the side of the head 11 to be in slidable engagements with the pair of rail members 13a and 13b. Thus the head 11 may move to the right and left of FIG. 2 by means of slidable engagements of the guide members 15a and 17a with the rail member 13a, and also of the guide members 15b and 17b with the rail member 13b.

Figure 7:
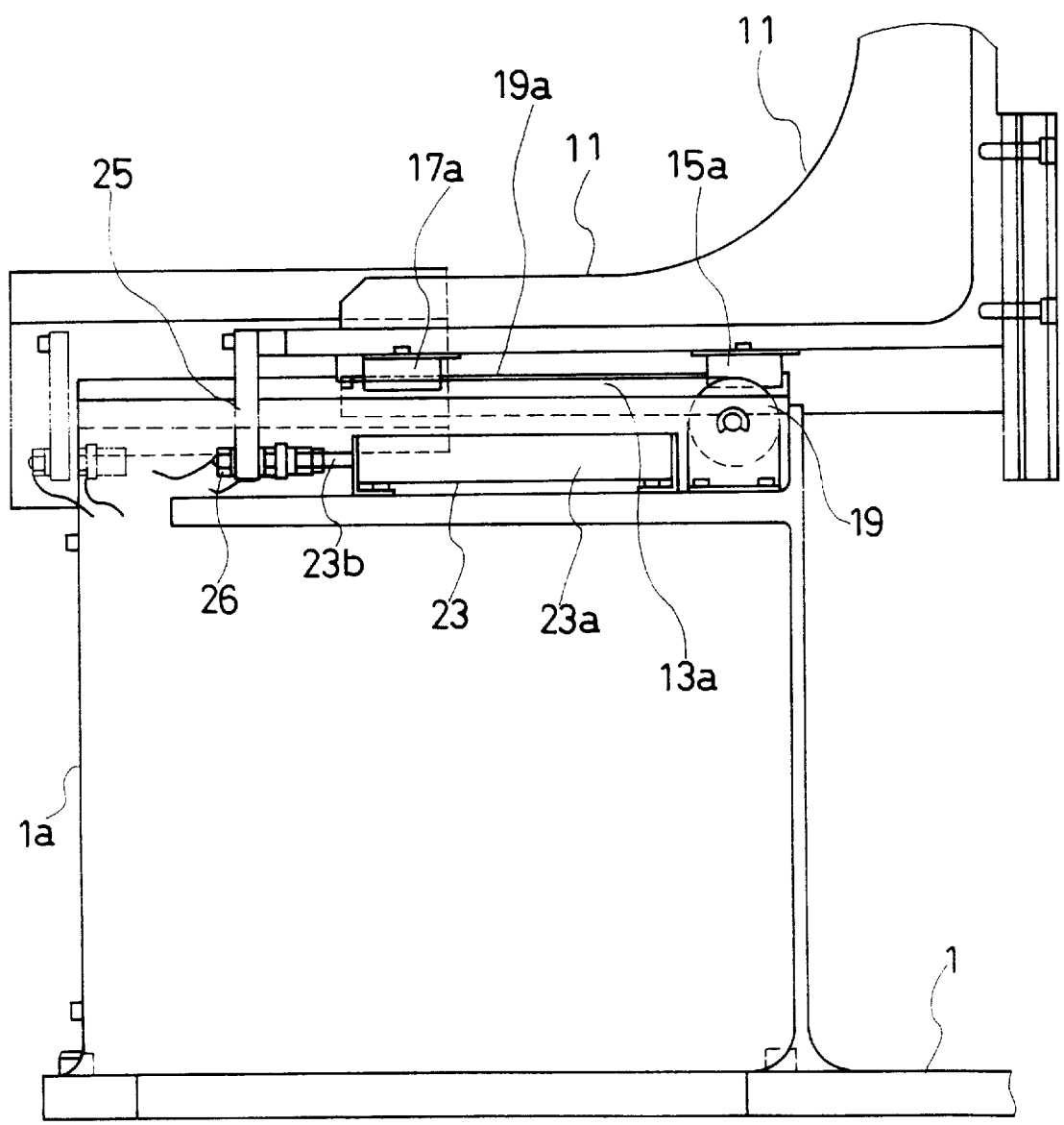
FIG. 7 is an expanded side view showing a head of the working apparatus and a structure to move the head in forward and rearward directions according to the first embodiment of the present invention.
Figure 8:
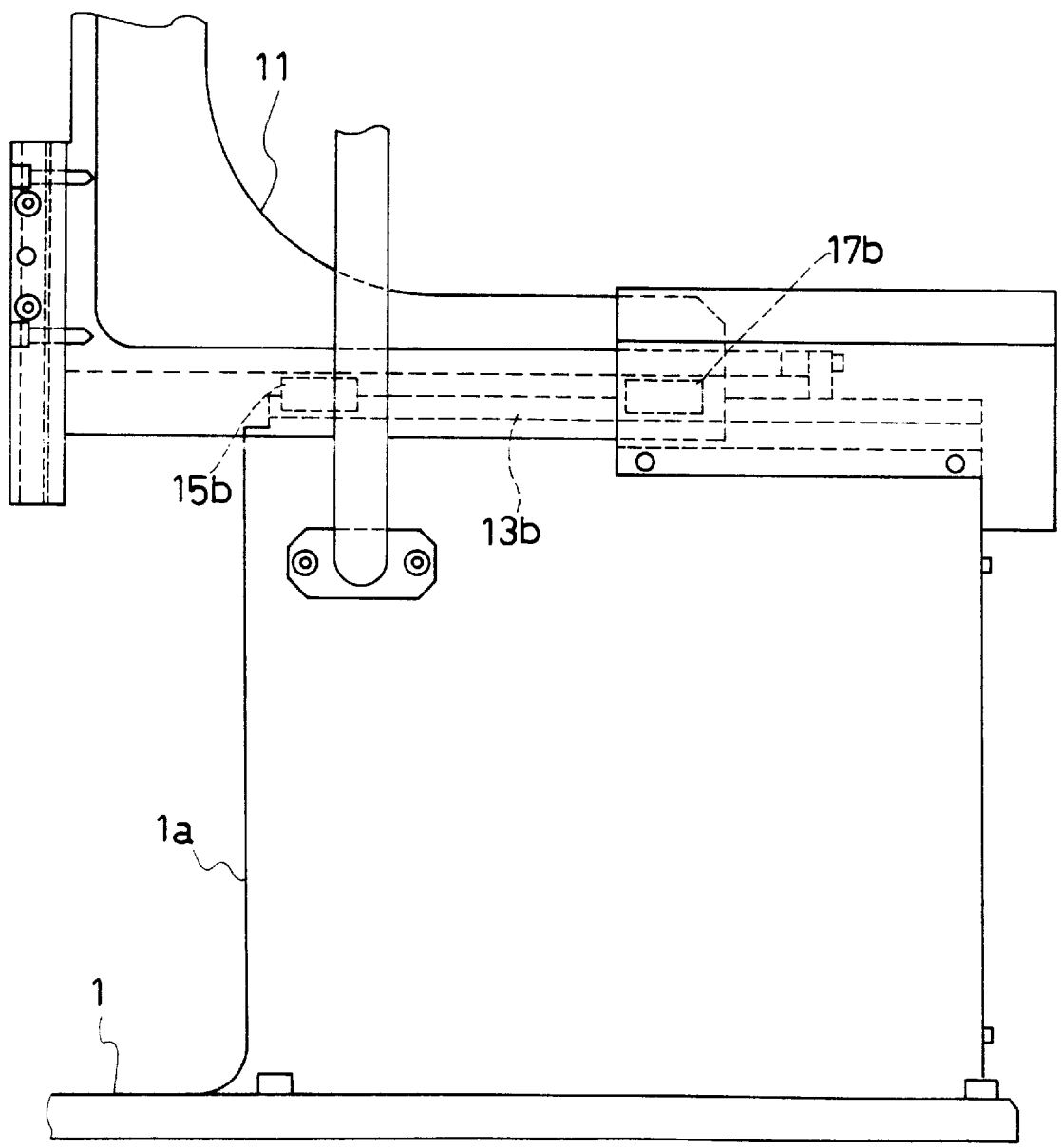
FIG. 8 is an expanded side view showing a head of the working apparatus and a structure to move the head in forward and rearward directions according to the first embodiment of the present invention.

As illustrated in FIGS. 6 and 7, there is a pressing means 19 provided at the space between the head 11 and the protrusion 1a. The pressing means 19 in the present embodiment is so-called "spring-type elastic member," of which an end 19a is in connection with the head 11. Thus a force toward the left of FIG. 2 is always applied to the head 11 by this pressing means 19.

Further, as illustrated in FIG. 7, there is also a cylinder mechanism 23 provided at a space between the head 11 and the protrusion 1a. The cylinder mechanism 23 comprises a cylinder 23a attached on the side of the protrusion 1a and a piston rod 23b attached so as to move into or out of the cylinder 23a. The piston rod 23b can be in or out of contact with a connecting member 25 which is connected on the side of the head 11. When the cylinder mechanism 23 is actuated, the piston rod 23b protrusively moves out of the cylinder 23a, thereby the head 11 is moved toward the left of FIG. 7 against the elastic force of the pressing means 19, thus the head 11 becomes a stand-by state.

The connecting member 25 is provided with a switch 26, which detects when the piston rod 23b loses contact with the connecting means 25.

The meanings of detection by the switch 26 will be described in detail in the explanation of function of the present invention.

Figure 3:
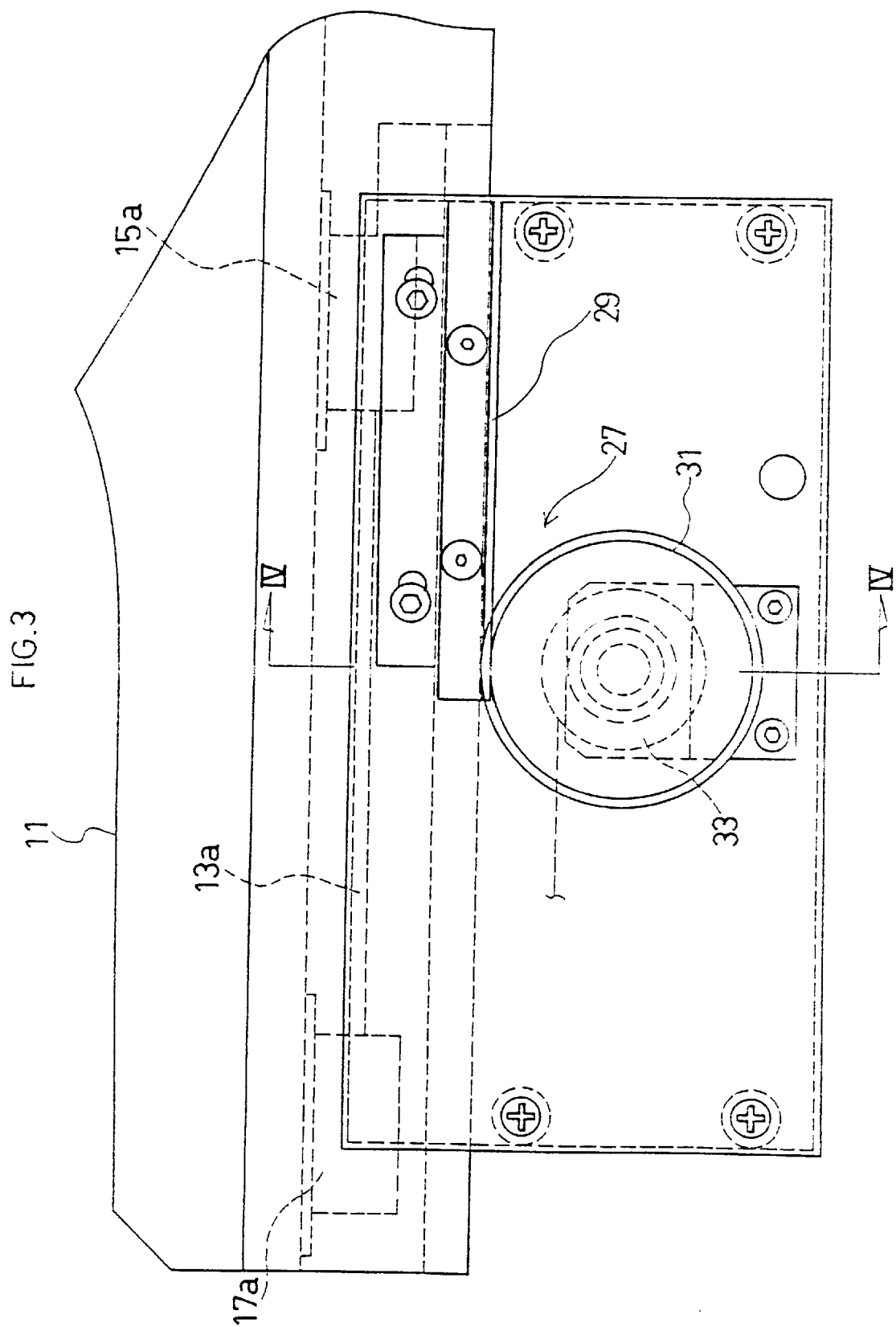
FIG. 3 is a side view showing a structure of a rack/pinion mechanism to detect a position of a tool in forward and rearward directions according to the first embodiment of the present invention.
Figure 4:
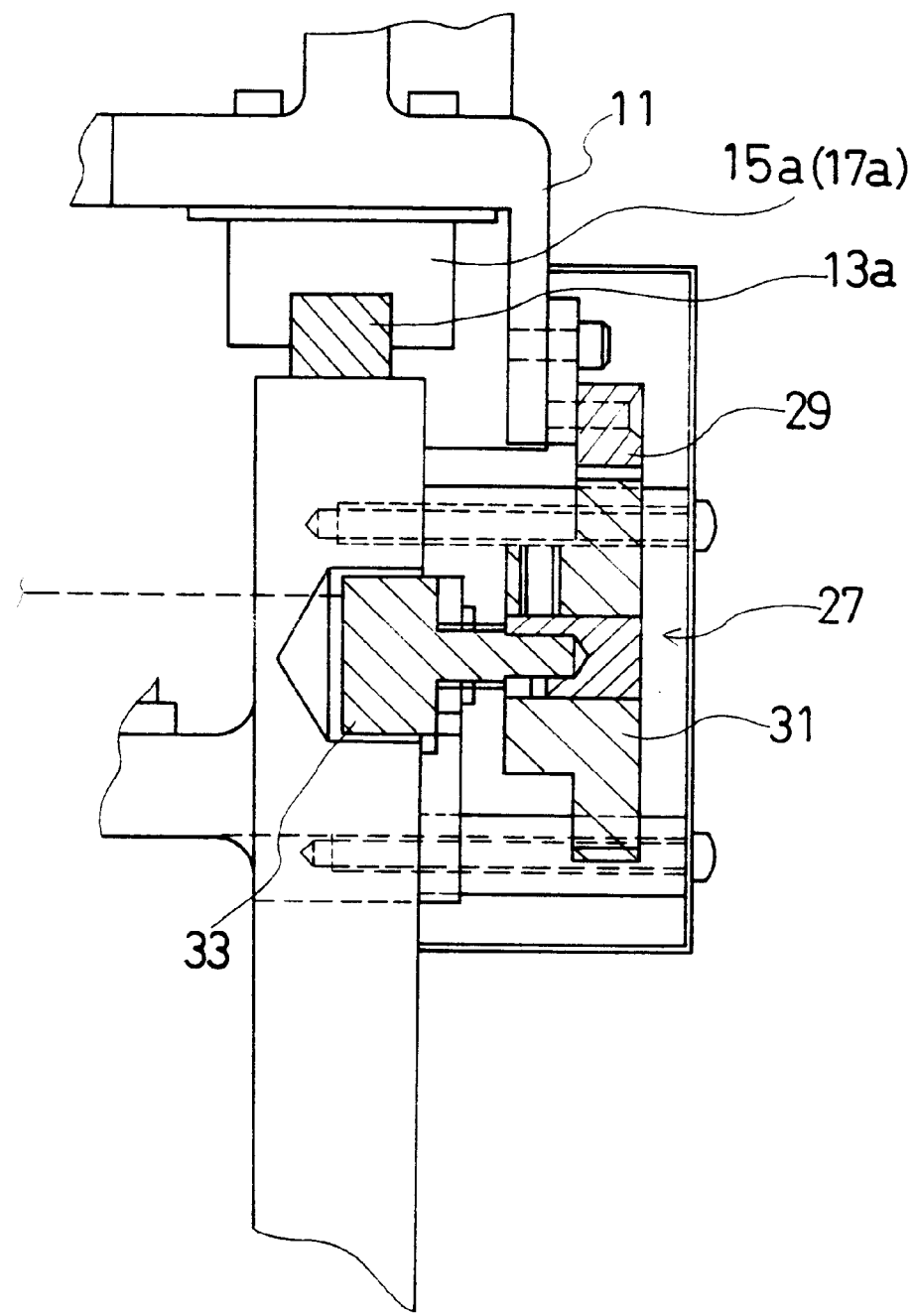
FIG. 4 is a sectional view cut along a line IV—IV in FIG. 3 according to the first embodiment of the present invention.

The forward and rearward positions of the head 11 can be detected by a position detecting means 27. As illustrated in FIGS. 2 through 4, the position detecting means 27 comprises a rack gear 29 mounted on the side of the head 11, and a pinion gear 31 to be engaged with the rack gear 29. When the head 11 forwardly or rearwardly moves, the rack gear 29 also moves together with the movement of the head 11, thereby the pinion gear 31 rotates in the corresponding direction by the corresponding amount. Thus the position of the head 11 is detected based on the obtained direction and amount of rotation of the pinion gear 31.

The pinion gear 31 is provided with a variable controller (potentiometer) 33, from which a control signal is transmitted to the work piece rotation driving motor 7, so as to control the rotation speed of the work piece rotation driving motor 7, as well as to control the cutting feed speed of the work piece 5.

The rotation speed control of the work piece rotation driving motor 7 will be described afterwards in detail.

Now referring back to FIG. 1, there is a tool base 37 mounted at an end of the head 11 to be movable in upward and downward directions of FIGS. 1 and 2 by means of a slider mechanism 35. Since the structure of the slider mechanism 35 is substantially the same as that of the slider mechanism 9, the detailed illustration and explanation thereof will be omitted.

The tool base 37 is provided with a spindle 39 in a rotatable state, and the spindle 39 is connected to a tool rotation motor 43 via a coupling 41. The spindle 39 has a tool chuck mechanism 45 mounted on the top thereof, and as shown in FIG. 5, any tool such as a chamfering cutter 47 is attached to the tool chuck mechanism 45, further a guide roller 49 having the common axis is also attached to the tool chuck mechanism 45.

As illustrated in FIG. 2, there is a cylinder mechanism 51 comprising a cylinder 53 and a piston rod 55 attached so as to move into or out of the cylinder 53. There exists a relationship between the piston rod 55 and the tool base 37, namely, when the cylinder mechanism 51 is actuated, the piston rod 55 is elongated in the upward direction, hence the tool base 37 becomes a stand-by state.

Figure 1:
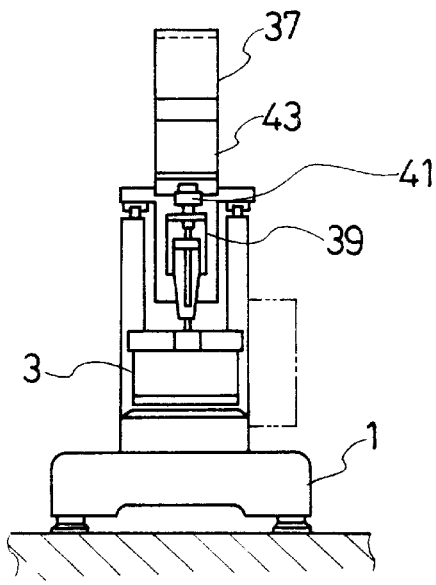
FIG. 1 is a front view showing an overall structure of a working apparatus according to a first embodiment of the present invention.
Figure 5:
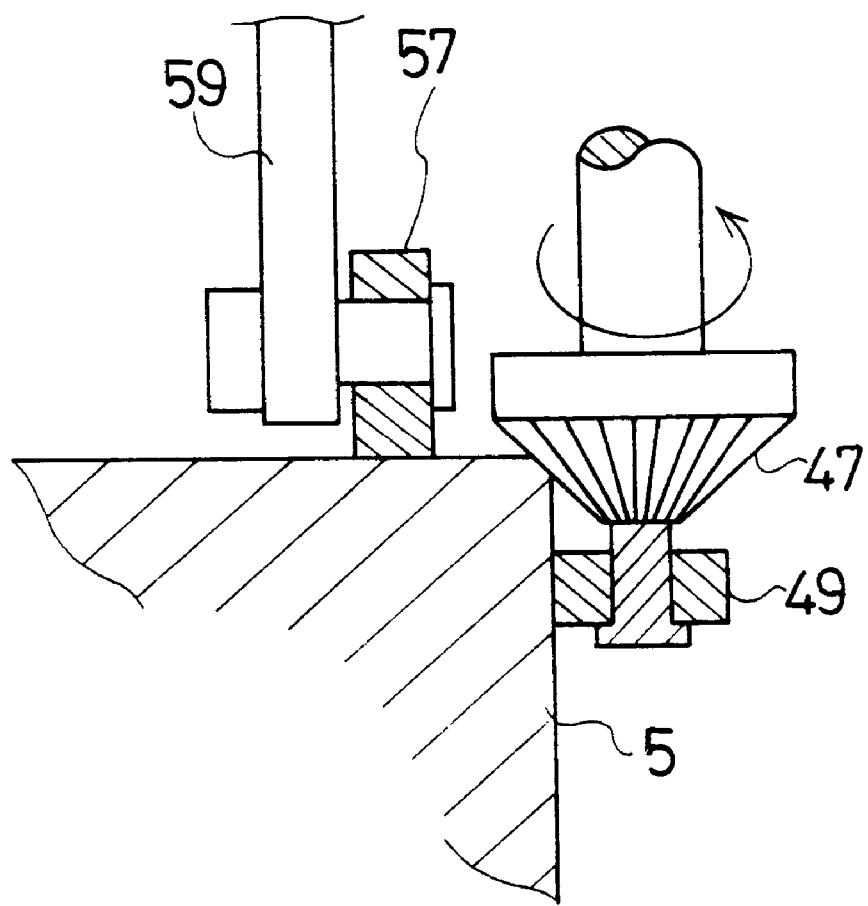
FIG. 5 is a view showing a structure of a chamfering cutter and a guide roller according to the first embodiment of the present invention.

As shown in FIGS. 1, 2 and 5, there is another guide roller 57 attached to the tool base 37 via a supporting member 59.

Figure 9:
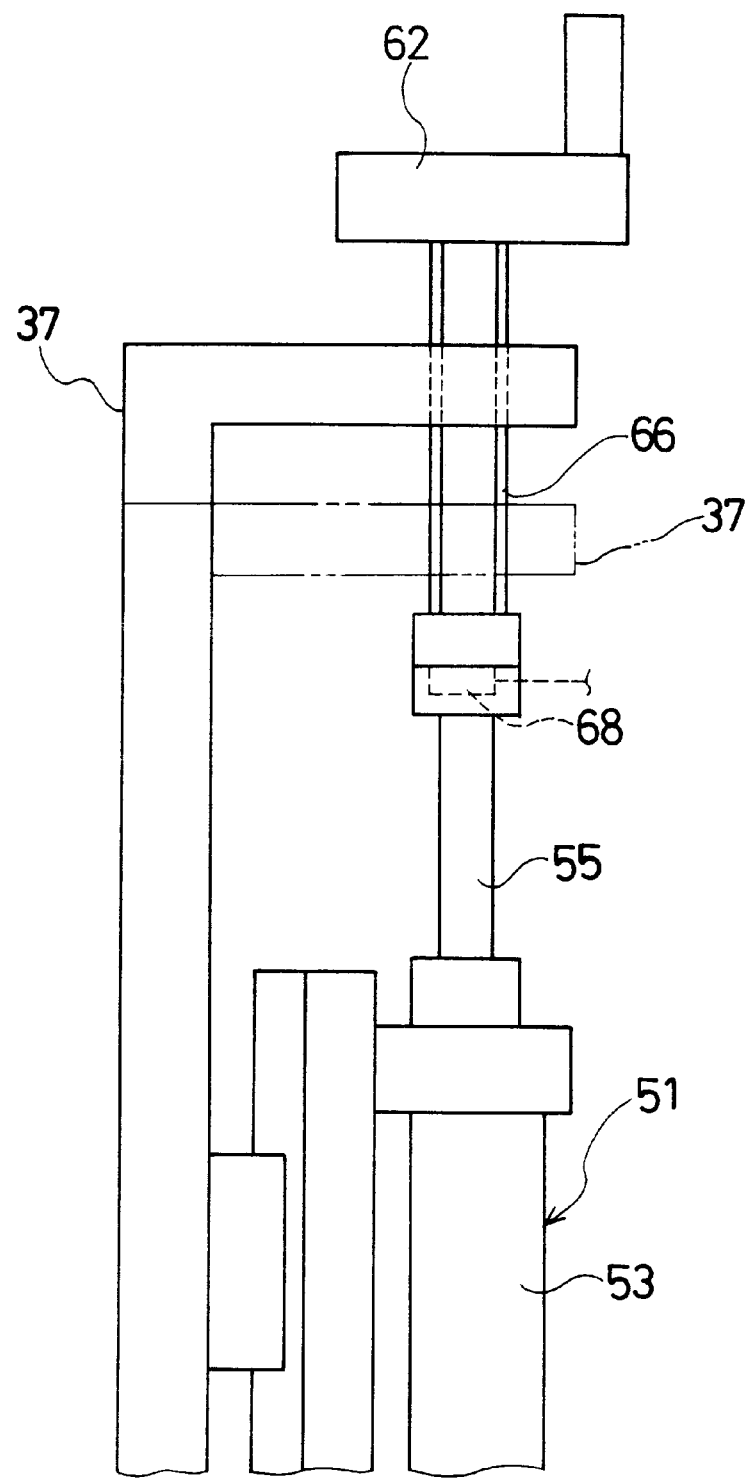
FIG. 9 is an expanded side view showing a structure to adjust upward position of a tool base according to the first embodiment of the present invention.

The fine position adjustment of the guide roller 57 in perpendicular direction can be made by means of a chamfering amount adjustment knob 60. In addition, when the tool base 37 becomes the stand-by state due to the cylinder mechanism 51, the position thereof is controlled to be at a predetermined position according to a structure as illustrated in FIG. 9, which can be adjusted by rotating a handle 62 of a screw member 66. Namely, by appropriately rotating the handle 62, the tool base 37 moves up and down in a perpendicular direction by the corresponding amount. For example, by setting the position as illustrated by the continuous line in FIG. 9, the tool base 37 accordingly moves up to the position of the continuous line through elongating of the piston rod 55 by actuating the cylinder mechanism 51. To the contrary, by setting the position as illustrated by the virtual line in FIG. 9, the tool base 37 moves up only to the position of the virtual line through elongating of the piston rod 55 by actuating the cylinder mechanism 51. By such a mechanism, the stand-by position of the tool base 37 can be adjusted.

The above described adjustment will be made with reference to the position where the guide roller 49 may not run above the side surface of the work piece 5.

In addition, the piston rod 55 is provided with a switch 68, which detects when the top of the piston rod 55 loses contact with the screw member 66.

The meanings of detection by the switch 68 will also be described in detail in the explanation of function of the present invention.

The function of the present embodiment will now be described based on the structure as above discussed.

Figure 20:
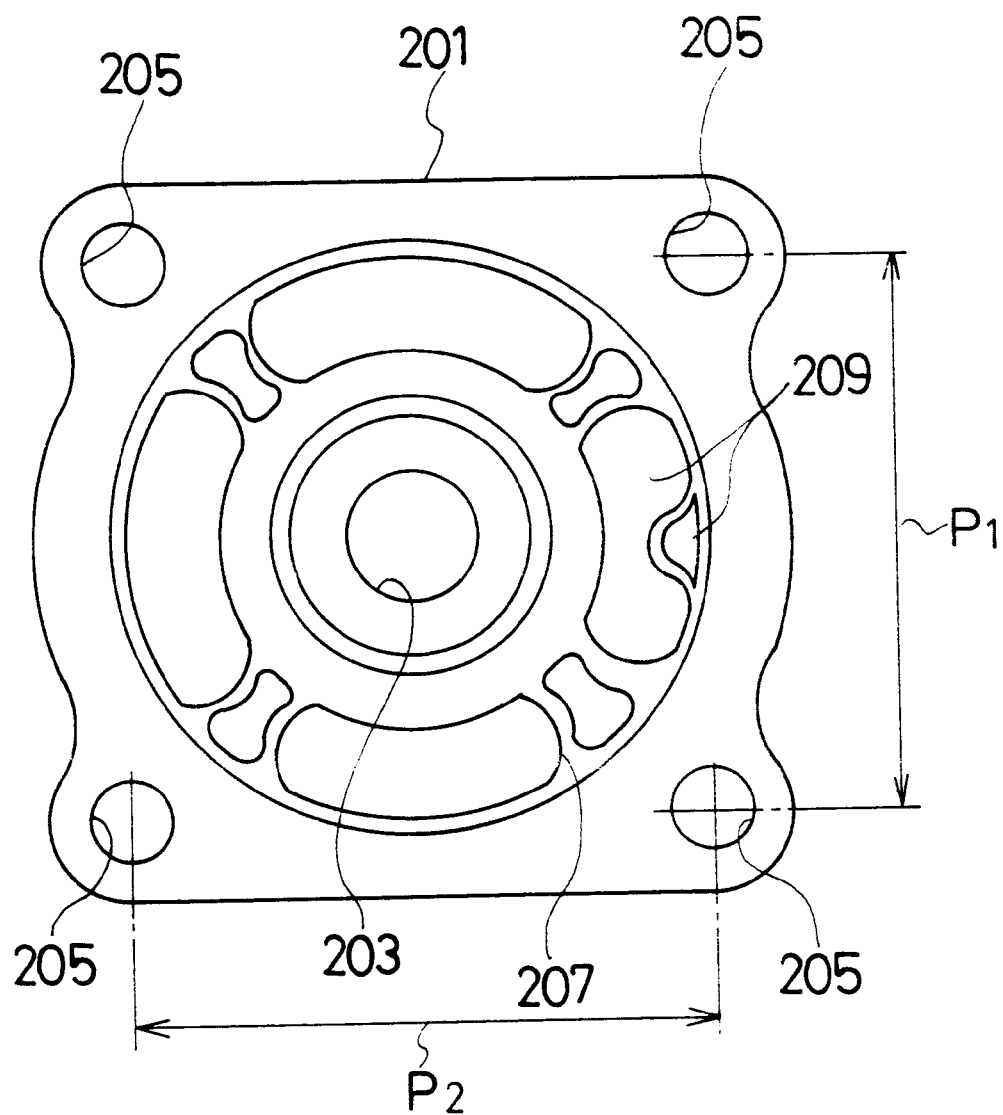
FIG. 20 is a plan view of a work piece as a reference to a prior art.
Figure 21:
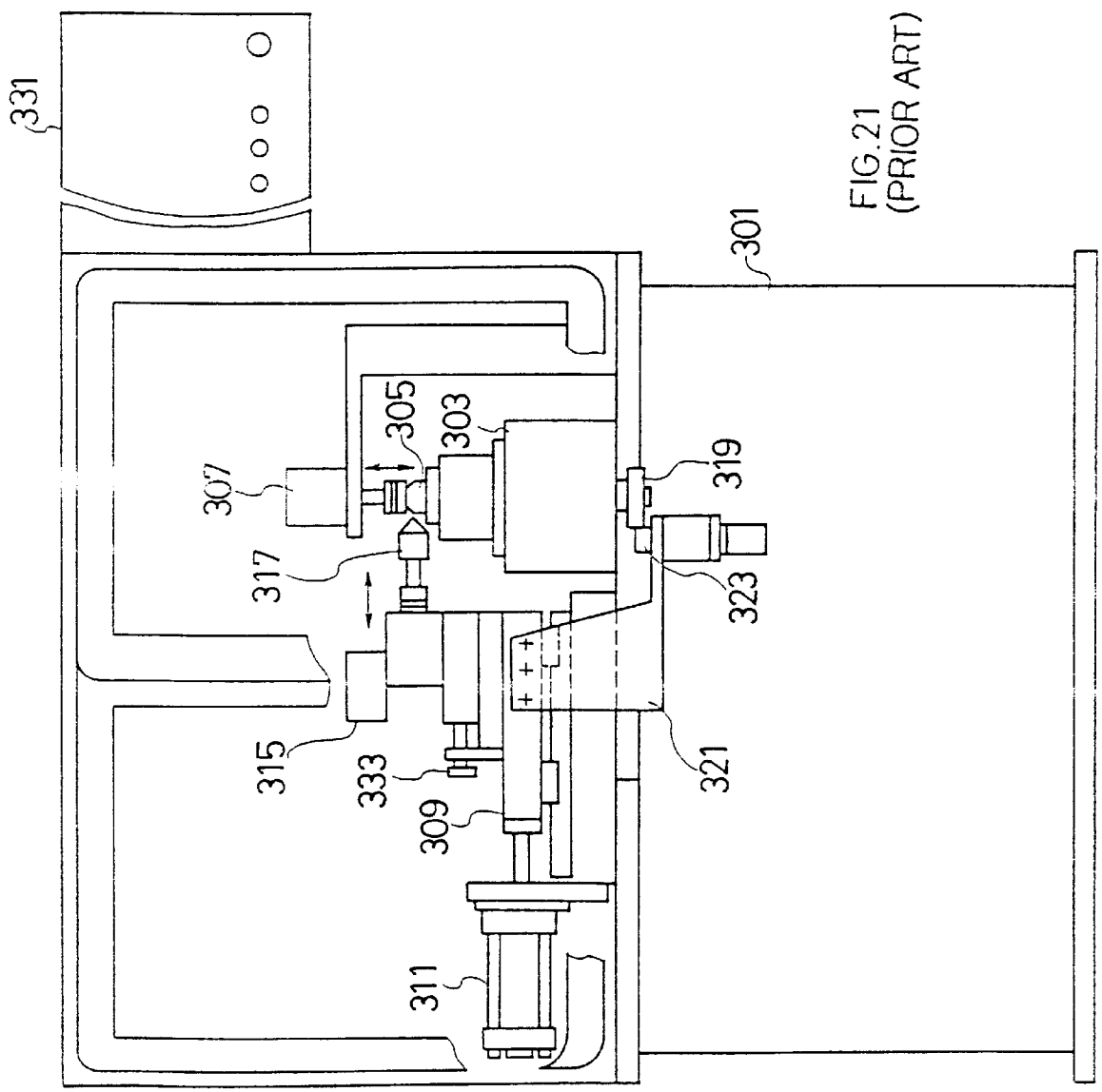
FIG. 21 is an elevational view of a cutting apparatus according to a prior art.
Figure 22:
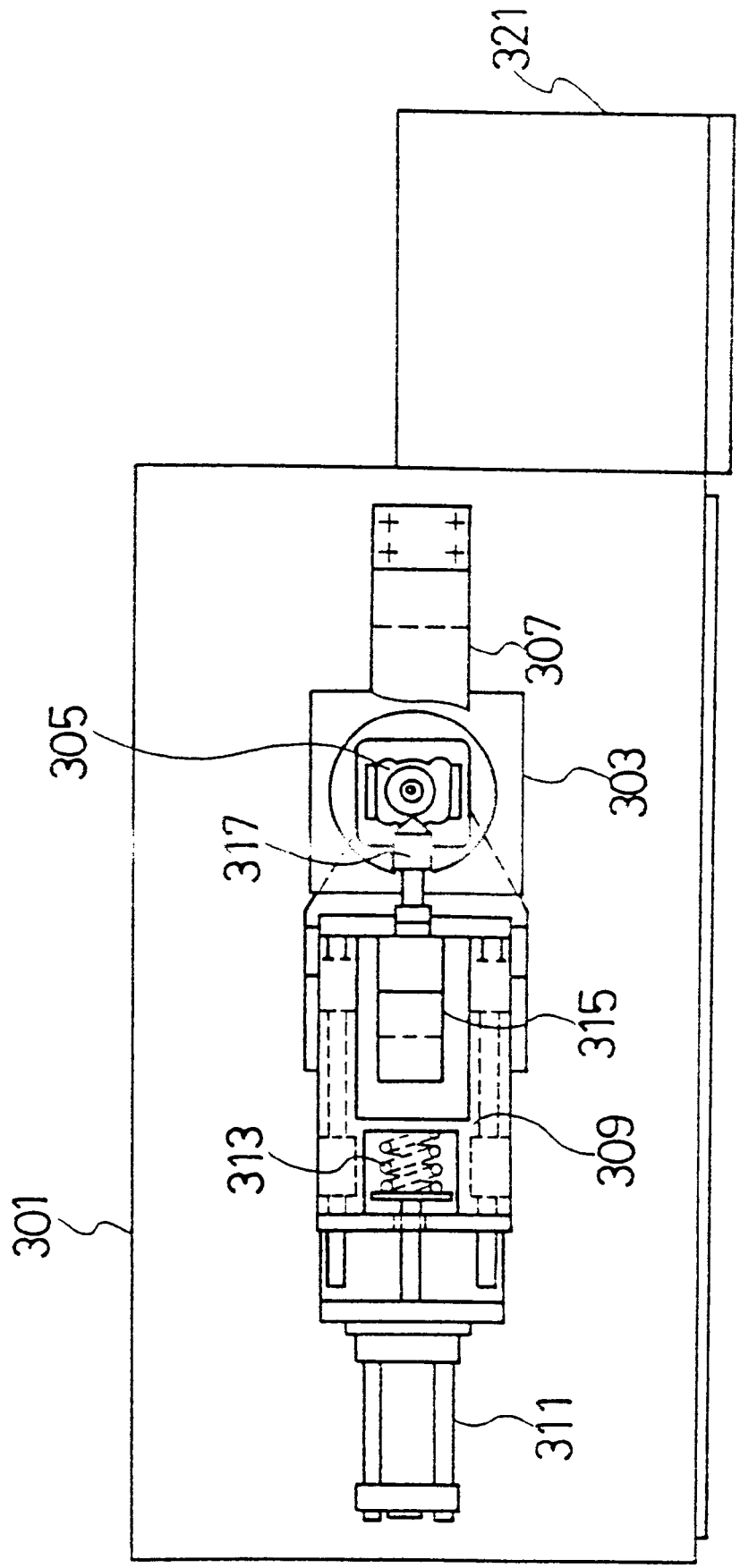
FIG. 22 is a plan view of the cutting apparatus according to the prior art.
Figure 23:
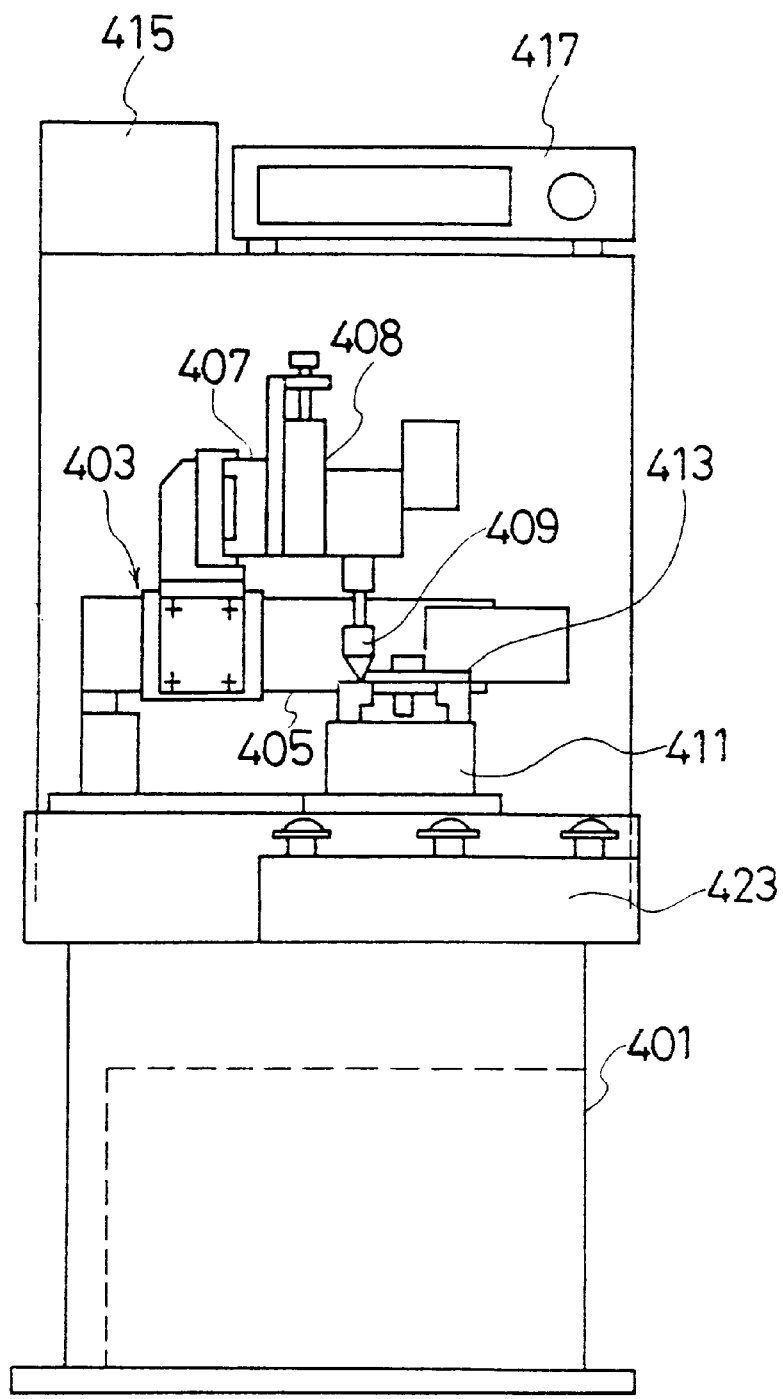
FIG. 23 is a front view of a cutting apparatus according to another prior art.
Figure 24:
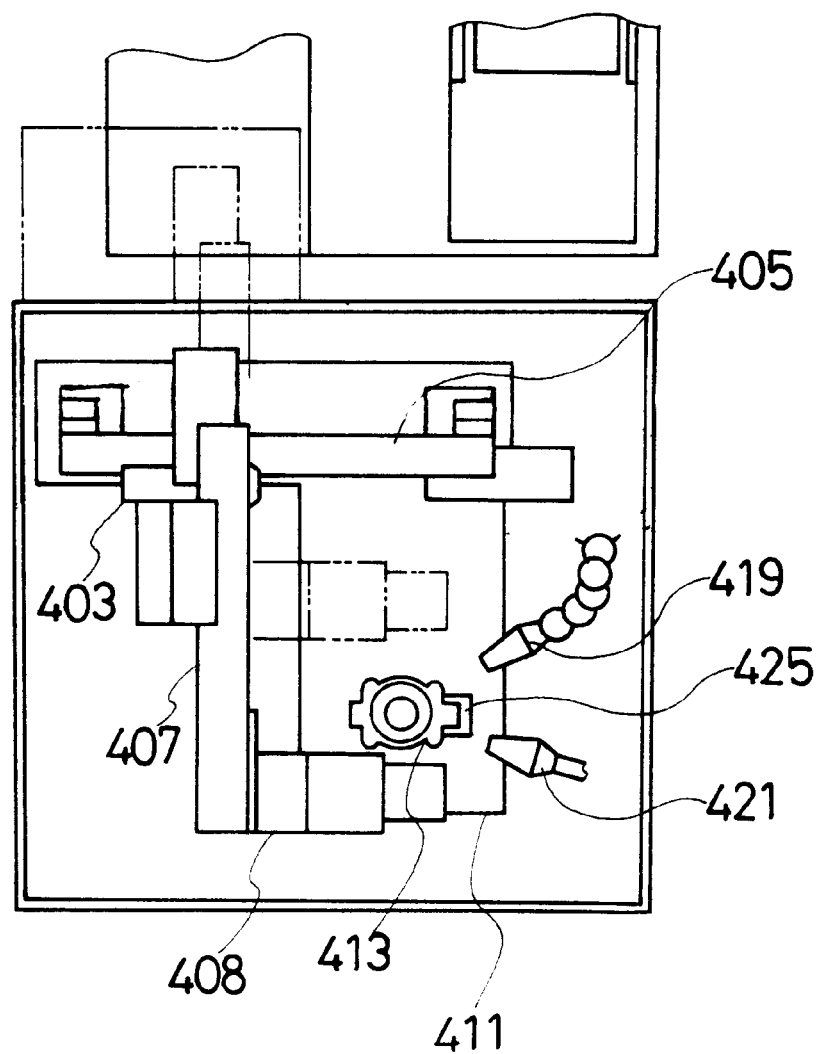
FIG. 24 is a plan view of the cutting apparatus according to the other prior art.

In the present embodiment, the description will be made for the case of chamfering against the outer peripheral edge of the work piece 5 of FIG. 20 which were used for explanation of the prior art.

Firstly, the head 11 is in a stand-by state in horizontal direction by the cylinder mechanism 23, and the tool base 37 is also in a stand-by state in perpendicular direction by the other cylinder mechanism 51.

Then the work piece 5 is mounted and fixed on the work piece chuck unit 3. In this occasion, the mounting and fixing position of the work piece 5 is not limited as long as the center of rotation of the work piece chuck unit 3 is included in the position of the work piece 5.

When the application of force to the head 11 by the cylinder 23 is released, the head 11 goes forward (toward the work piece 5), and the guide roller 49 touches the side surface of the work piece 5. At that time, the forward movement of the head 11 from that position is prohibited, but since the piston rod 23b of the cylinder mechanism 23 moves into the cylinder 23a by the amount more than that of the forward movement of the head 11, there appears a space between the piston rod 23b and the connecting member 25. Such a space is detected by the switch 26, and the detection signal actuates the down movement of the tool base 37.

Accordingly, the application of force to the tool base 37 by the cylinder mechanism 51 is released, thereby the tool base 37 goes down because of its own set weight. Then the guide roller 57 touches the upper surface of the work piece 5, and the downward movement of the tool base 37 from that point is prohibited, but since the piston rod 55 of the cylinder mechanism 51 moves into the cylinder 53 by the predetermined amount more than that of the downward movement of the tool base 37, there appears a space between the top of the piston rod 55 and the screw member 66. Such a space is detected by the switch 68, and the detection signal actuates the rotation of the work piece 5.

At that time, since the chamfering cutter 47 is rotating, a predetermined chamfering can be carried out against the outer peripheral edge of the work piece 5 by only rotating the work piece 5 at an angle of 360°.

Then the finished work piece 5 is removed, and a fresh work piece 5 is set to which a same cycle of working is applied.

Secondly, the operation in the horizontal direction will be described. A force toward the work piece 5 is applied to the head 11 by the pressing means 19, thus the chamfering cutter 47 becomes in a state of being pressed on the outer peripheral edge of the work piece 5 by a predetermined pressing force. The guide roller 49 becomes in contact with the outer cylindrical part of the work piece 5, in order to profile the contour thereof according to rotation of the work piece 5. Namely, according to variation of the contour of the work piece 5, the contour thereof is profiled by means of the corresponding movement of the guide roller 49 in the horizontal direction. Synchronized with such a movement of the guide roller 49, the chamfering cutter 47 also moves in the forward and rearward directions, and at that time the constant pressing force applied to the work piece 5 is maintained by the pressing means 19. Therefore, even when the contour of the work piece 5 varies, the guide roller 49 is kept pressed to be in contact with the outer peripheral edge of the work piece 5, thus the chamfering by a prescribed chamfering amount can be carried out.

According to the variation of contour of the work piece 5, the distance from the center of the work piece 5 to the chamfering cutter 47 also varies. Therefore, if the rotation speed of the work piece 5 is kept unchanged, the change of cutting feed speed of the work piece 5 occurs.

Therefore, according to the present embodiment, the rotation speed of the work piece 5 is appropriately controlled by detecting the position of the chamfering cutter 47.

For example, when the diameter of the work piece 5 becomes larger and the chamfering cutter 47 should move in the rearward direction, the rack gear 29 in FIG. 3 rearwardly moves (namely, toward the left side of FIG. 3), thereby the pinion gear 31 rotates counterclockwise by a predetermined amount, and such a change is detected by the variable controller 33 to transmit the control signal to the work piece rotation driving motor 7. Accordingly, the rotation speed of the work piece rotation driving motor 7 becomes slower.

To the contrary, when the diameter of the work piece 5 becomes smaller and the chamfering cutter 47 should move in the forward direction, the rack gear 29 in FIG. 3 forwardly moves (namely, toward the right side of FIG. 3), thereby the pinion gear 31 rotates clockwise by a predetermined amount, and such a change is detected by the variable controller 33 to transmit the control signal to the work piece rotation driving motor 7. Accordingly, the rotation speed of the work piece rotation driving motor 7 becomes faster. In the thus described structure, a constant cutting feed speed of the work piece 5 is maintained.

The operation will now be discussed with regard to the perpendicular direction. The outer length in the perpendicular direction, namely the thickness of the work piece 5 as shown in FIG. 5 does not vary and maintains the constant thickness thereof. Therefore the guide roller 57 keeps in contact with the work piece 5 at a constant level.

However, there may be several cases that the thickness of the work pieces 5 vary. In such a case, the guide roller 57 moves up and down according to the variation of thickness of the work piece 5 in order to profile the contour thereof, thereby the tool base 37 as a whole makes upward and downward movements. Accordingly, even when the thickness of the work piece 5 varies, the chamfering cutter 47 maintains a constant chamfering amount against the work piece 5 in order to carry out the chamfering.

The present embodiment has the following merits.

Firstly, it is possible to carry out a desired chamfering against the work piece 5, in a simple structure, by simple operation, and without requiring the complicated and expensive control such as to use the load sensor. This is because the present embodiment has a structure that the pressing means 19 makes the chamfering cutter 47 press so as to be in constant contact with the work piece 5 at a predetermined pressing force, and that the chamfering cutter 47 forwardly and rearwardly moves by profiling the contour of the work piece 5 through detection of variation of diameter of the outer periphery of the work piece 5 by the guide roller 49.

Secondly, since the cutting feed speed of the work piece 5 does not change due to variation of the contour of the work piece 5, the accuracy and efficiency of working may improve.

Thirdly, even when the contour of the work piece 5 in perpendicular direction varies, the chamfering cutter 47 can move up and down according to such a variation through detection by the guide roller 57. Therefore, it is possible to carry out the predetermined chamfering at a constant chamfering amount, not only for variation of the contour of the work piece 5 in horizontal direction, but also for that in perpendicular direction.

Finally, as for the mounting and fixing position of the work piece 5, it is possible to mount and fix the work piece 5 against the work piece chuck unit 3, as long as such a position includes the center of rotation of the work piece chuck unit 3. In addition, the working can be carried out from any position of the rotation direction of the work piece 5. Therefore the mounting and fixing procedures of the work piece 5 become remarkably simple.

(Second Embodiment)

Figure 10:
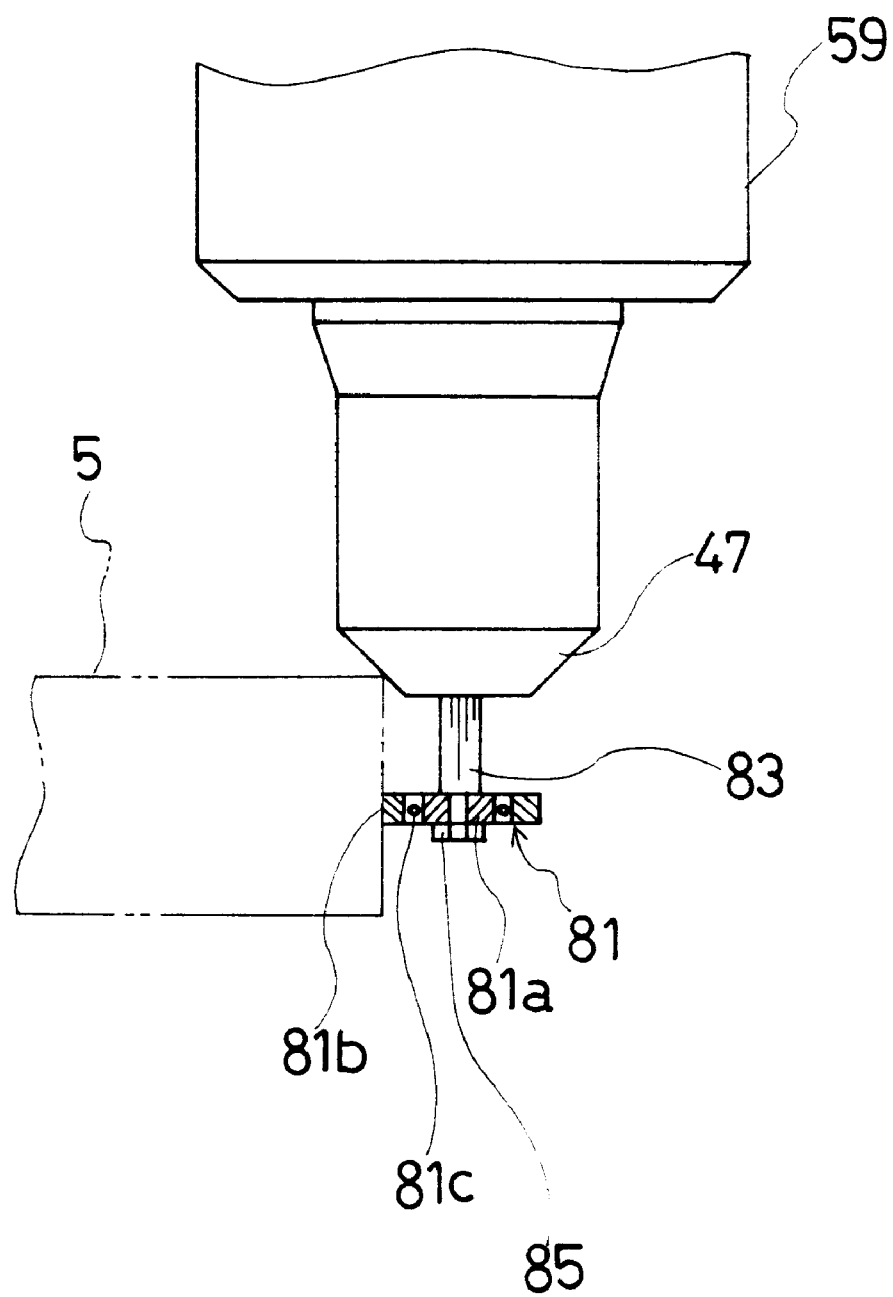
FIG. 10 is a side view showing a structure of a profiling apparatus according to a second embodiment of the present invention.
Figure 11:
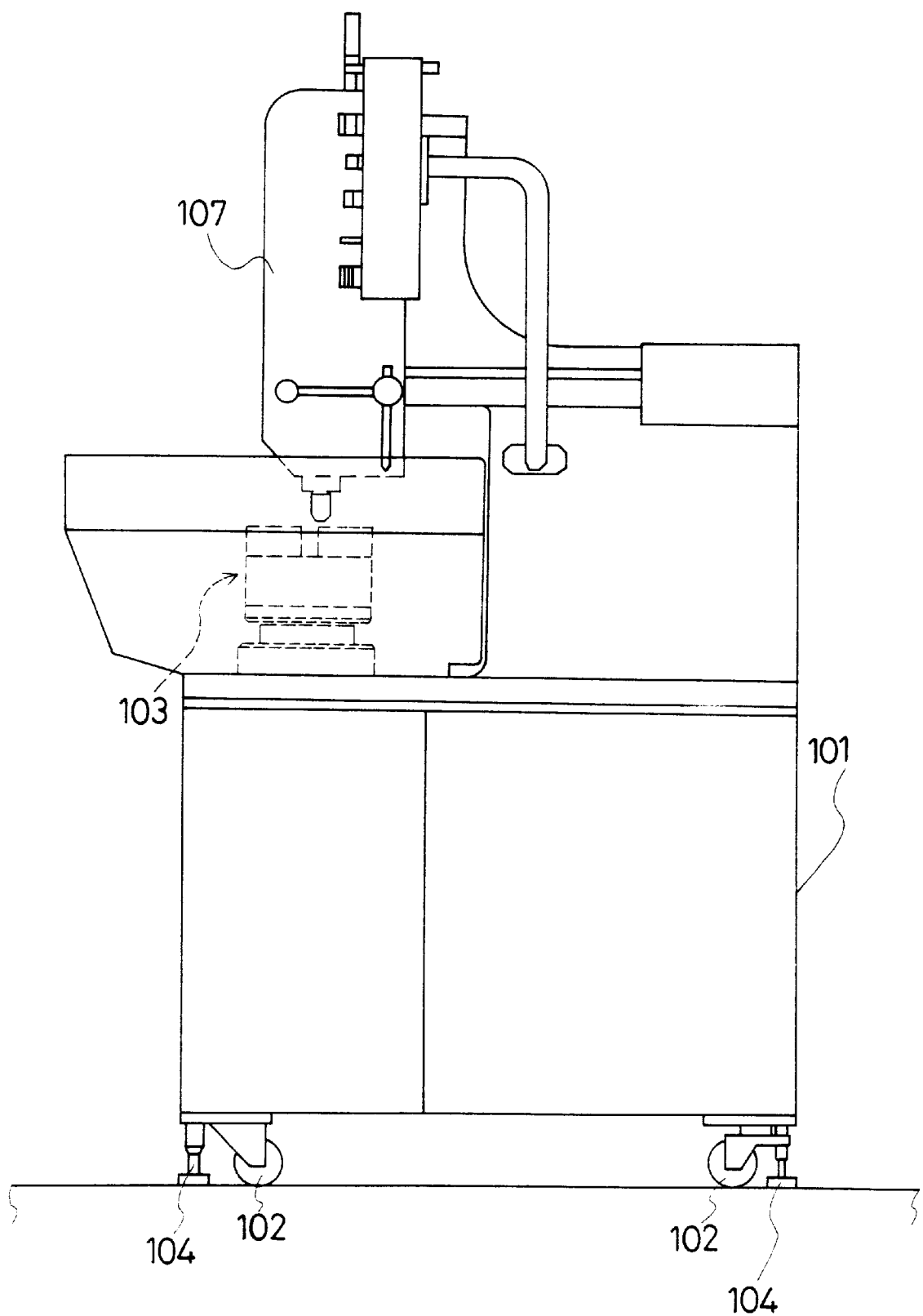
FIG. 11 is a side view showing an overall structure of a working apparatus according to a third embodiment of the present invention.
Figure 12:
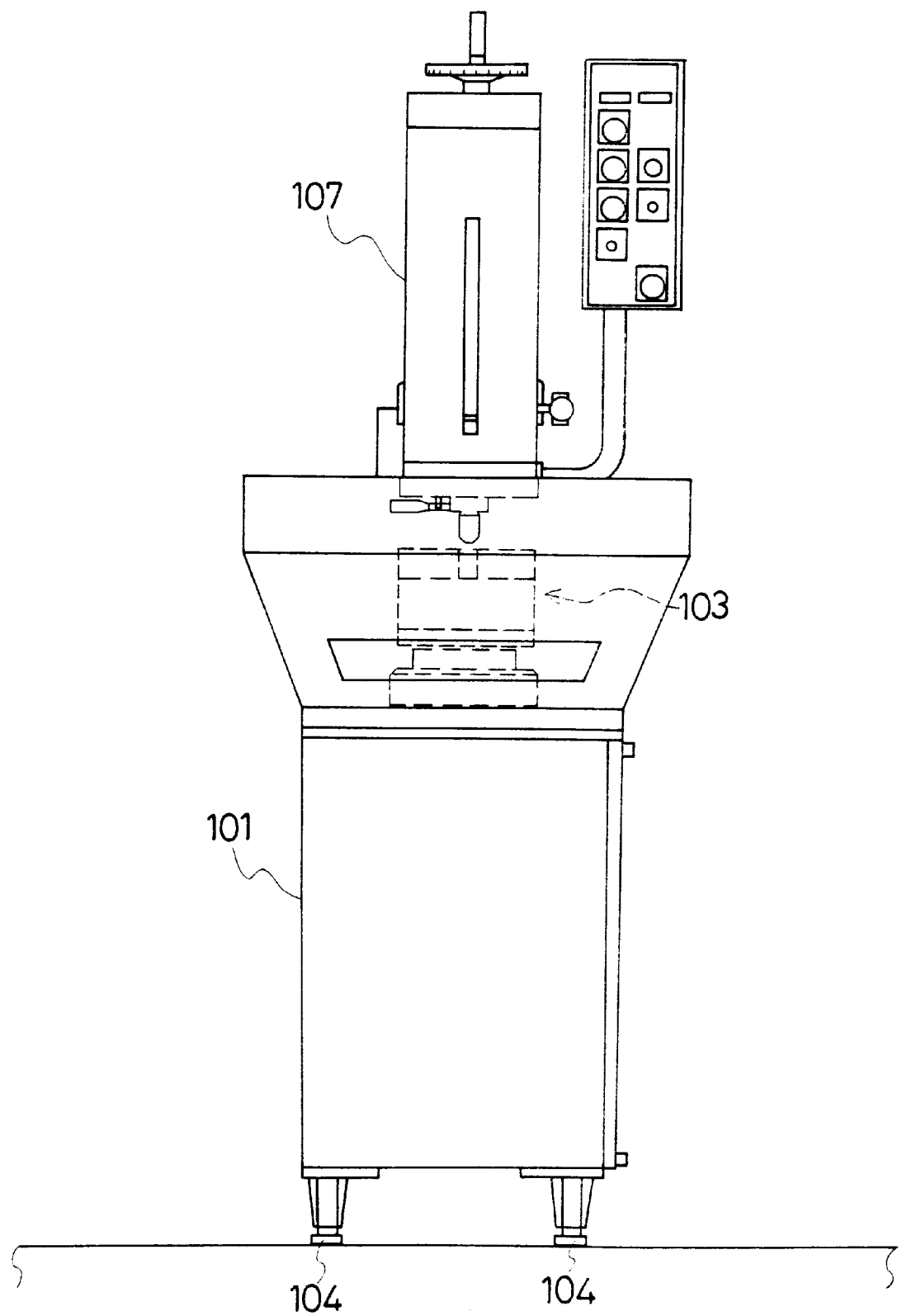
FIG. 12 is a front view showing an overall structure of the working apparatus according to the third embodiment of the present invention.

A second embodiment of the present invention will now be described with reference to FIG. 10. In the second embodiment, a bearing 81 performs as a profiling member. The bearing 81 comprises a inner ring 81a, an outer ring 81b, and a plurality of balls 81c placed between the inner ring 81a and the outer ring 81b. The inner ring 81a is mounted and fixed on a shaft member 83 via a fixing nut 85. The same effect as that of the first embodiment can be obtained by using the bearing 81 as above described.

(Third Embodiment)

A third embodiment of the present invention will now be described with reference to FIGS. 11 through 16. There is a base 101, of which bottom surface has a plurality of (in the present embodiment, four) moving casters 102 as well as a plurality of (in the present embodiment, also four) fixing devices 104 to fix the base 101 at an arbitrary position. A work piece chuck unit 103 is mounted on the base 101, and a work piece 105 (shown in the virtual line in FIG. 11) is mounted and fixed on the work piece chuck unit 103. The work piece chuck unit 103 is provided with a work piece rotation driving motor, which rotates the mounted and fixed work piece 105 at an angle of, for example, 360°.

Figure 13:
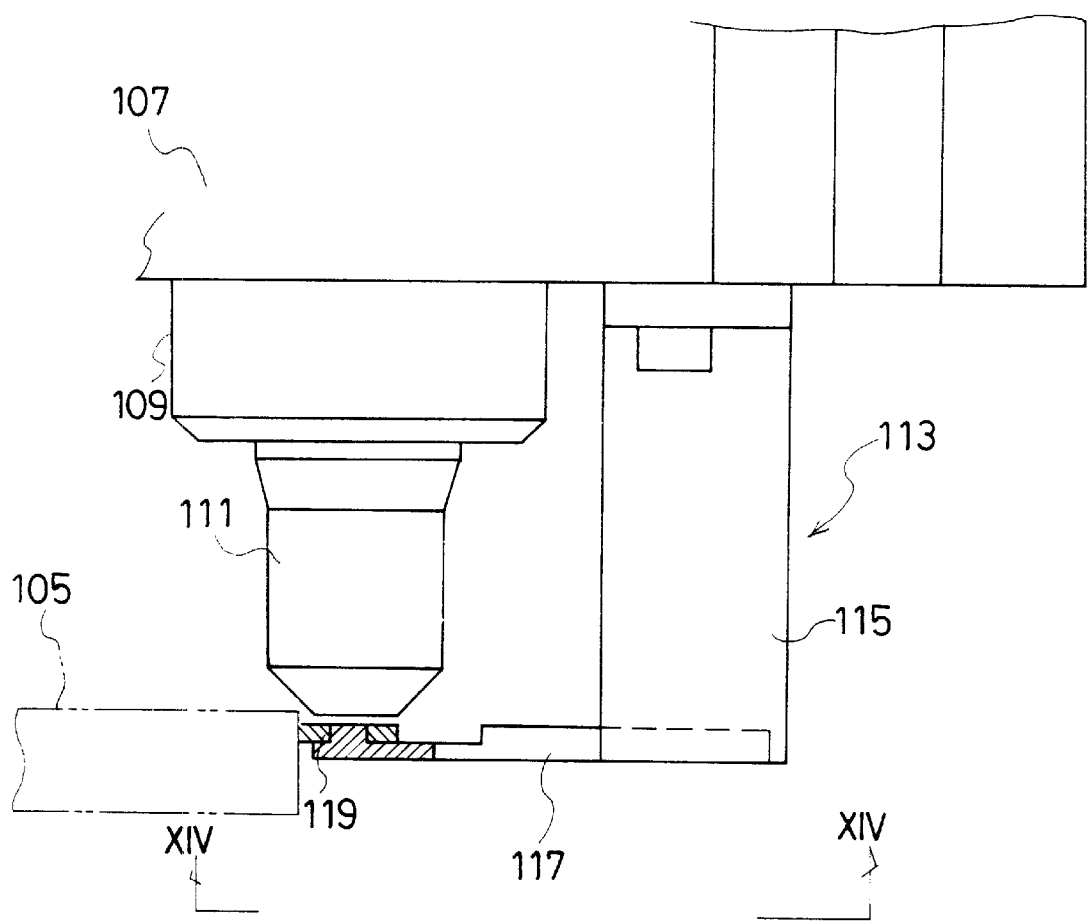
FIG. 13 is a side view showing a structure of a profiling apparatus according to the third embodiment of the present invention.

There is a tool base 107 provided at the upper section of the work piece chuck unit 103. The tool base 107 may move in the upward and rearward directions by a driving means, and also may move to be close to or away from the work piece 105. As illustrated in FIG. 13, the tool base 107 is provided with a spindle 109, and for example a rotary tool 111 as a working tool is attached to an end of the spindle 109. FIG. 13 shows the chamfering at a predetermined width through cutting by pressing the rotary tool 111 to be in contact with the upper edge of the rotating work piece 105.

Figure 14:
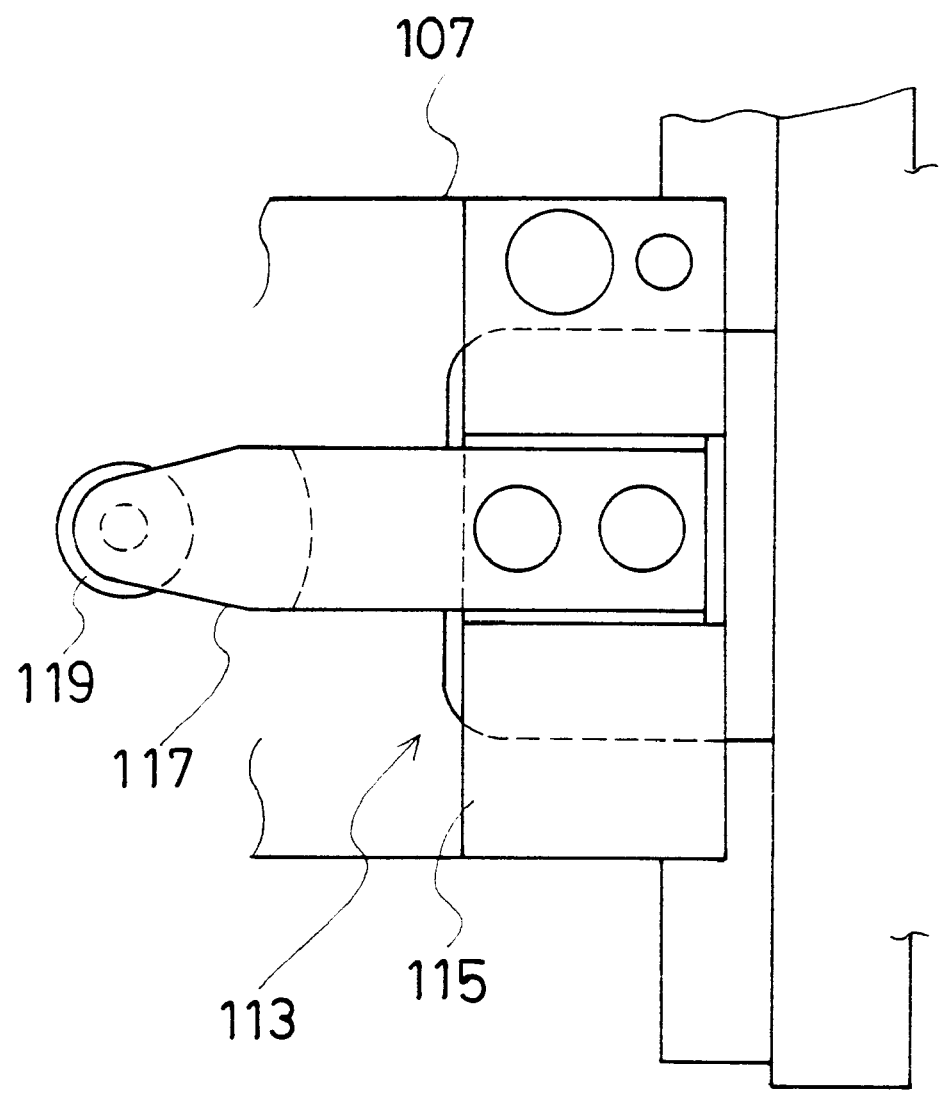
FIG. 14 is a view as viewed from a line between arrows XIV—XIV in FIG. 13 according to the third embodiment of the present invention.

The tool base 107 is provided with a profiling apparatus 113. As illustrated in FIGS. 13 and 14, the profiling apparatus 113 comprises, a perpendicular supporting member 115 which is downwardly elongated in vertical direction, a horizontal supporting member 117 which is elongated in the horizontal direction from an end of the perpendicular supporting member 115, and a profiling roller 119 as a profiling member attached to an end of the horizontal supporting member 117 to be rotatable in horizontal plane.

Figure 15:
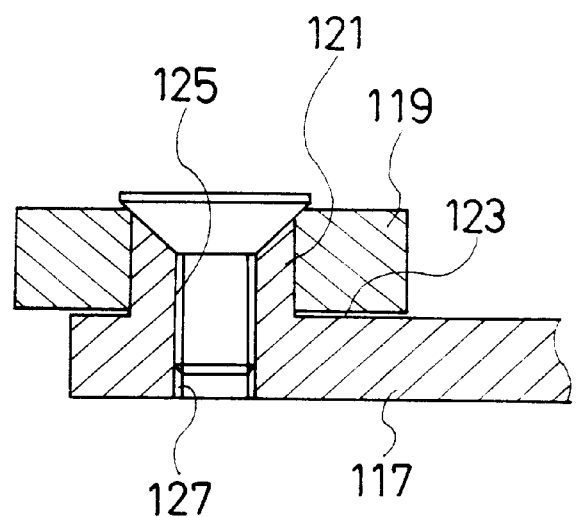
FIG. 15 is a sectional view showing a structure of a profiling apparatus according to the third embodiment of the present invention.

The structure of attachment of the profiling roller 119 to the horizontal supporting member 117 is as illustrated in FIG. 15. A pivot 121 is protrusively provided, in the upward direction, at an end of the horizontal supporting member 117. The outer periphery of the pivot 121 serves as a rest 123. A penetration hole 125 is formed at the center of the pivot 121, and an internal thread 127 is formed on the inner periphery of the penetration hole 125. A fixing screw 129 is engaged with the internal thread 127.

For attachment of the profiling roller 119, the profiling roller 119 is firstly positioned to be seated on the rest 123, then the fixing screw 129 is inserted to be engaged with the internal thread 127. Thus the profiling roller 119 as the profiling member is mounted in a rotatable state, with the detachment thereof being prohibited by a head 129a of the fixing screw 129.

The center of the pivot 121 of the horizontal supporting member 117 is positioned so as to coincide with the center of rotation of the rotary tool 111.

The structure of the tool base 107 to move to be close to or away from the work piece 105 in horizontal direction will be described. A predetermined force is applied to the whole body of the tool base 107 toward the work piece 105 by an unillustrated elastic means (for example, a spring-type elastic member), and the position of the profiling roller 119 is controlled by contact of the profiling roller 119 with the side surface of the work piece 105. When the work piece 105 is rotated by the work piece chuck unit 103, the profiling roller 119 forwardly and rearwardly moves according to the contour of the work piece 105, thus the profiling roller 119 profiles the contour of the work piece 105. Eventually, the tool base 107 as well as the rotary tool 111 move in the same direction and amount as those of the profiling roller 119, thereby the chamfering at a predetermined width can be carried out regardless of the contour of the work piece 105.

The function of the present embodiment will now be described. Firstly, the work piece 105 is mounted and fixed on the work piece chuck unit 103. The position of the work piece 105 has no limitation as long as such a position includes the center of rotation of the work piece chuck unit 103. Then the tool base 107 moves toward the work piece 105 (in the forward direction), thereby the profiling roller 119 of the profiling apparatus 113 becomes in contact with the side surface of the work piece 105. At that time, the profiling roller 119 is in a state of being pressingly in contact with the side surface of the work piece 105 at a predetermined pressing force. Then the tool base 107 goes down by a predetermined amount, thereby the rotary tool 111 becomes in pressing contact with the upper edge of the work piece 105 at a predetermined chamfering width. After that, when the work piece 105 is rotated at an angle of 360°, a predetermined chamfering can be carried out against the upper edge of the work piece 105.

In the above operation, the profiling roller 119 profiles the contour of the work piece 105, thereby the tool base 107 as well as the rotary tool 111 appropriately moves in forward and rearward directions. Eventually, it is possible to carry out the chamfering at a constant chamfering width regardless of the contour of the work piece 105.

The present embodiment has the following merits.

Firstly, since the profiling apparatus 113 is provided on the tool base 107 in a separate state from the rotary tool 111, it is possible to simplify the structure of the profiling apparatus 113, especially for the part of the profiling roller 119. For example, in the case of the second embodiment as above described, it is necessary to adopt the bearing in the attachment structure of the profiling roller 119. This is because the profiling roller 119 should be attached, so as to have the common axis with the rotary tool 111, in order to rotate synchronized with the rotary tool 111. To the contrary, in the present embodiment, the profiling roller 119 has no structure to rotate synchronized with the rotary tool 111, but a structure to be only rotated by the rotating work piece 105. Therefore the frictional wear will be lessened due to the slower rotation speed, hence the bearing mechanism as the second embodiment is no longer required. Therefore, as compared with the case of using the bearing mechanism, the outer ring and the balls are not required, and it is sufficient as long as the profiling roller 119 is provided, which reduces the diameter of the profiling roller 119.

Figure 16:
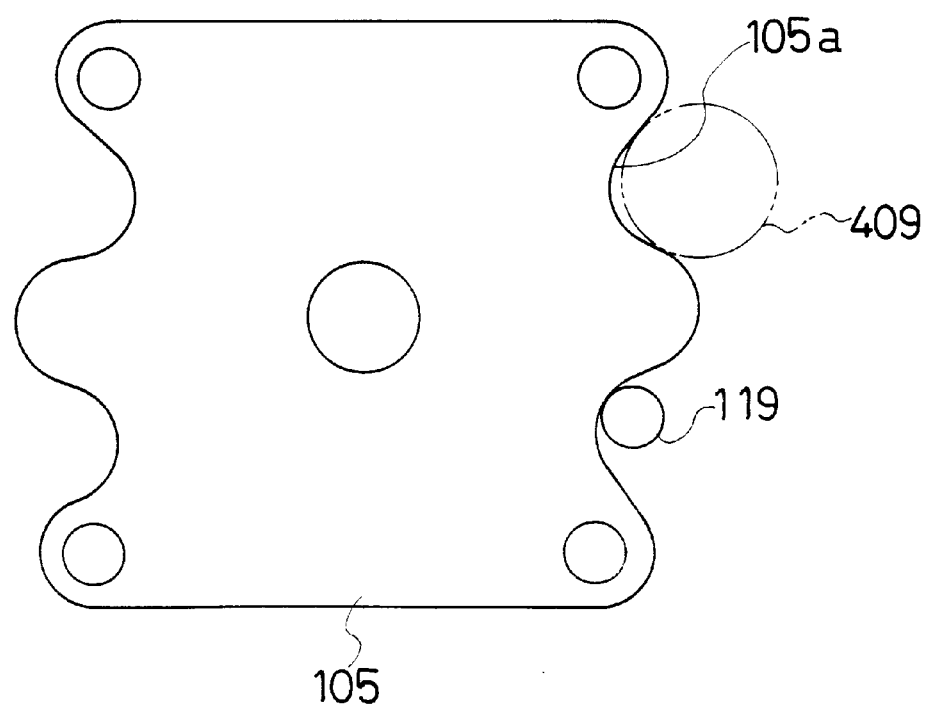
FIG. 16 is a view showing a function of the profiling apparatus according to the third embodiment of the present invention.

Secondly, as above described, since the diameter of the profiling roller 119 is reduced, it is possible to carry out a predetermined chamfering against a more complicated contour of the work piece 105. This merit will be described with reference to FIG. 16. As illustrated in FIG. 16, the contour of the work piece 105 is complicated, with having a small curvature of a depression 105a in a shape of arc. Therefore, if a bearing mechanism 409 is used, the diameter thereof is too large, as illustrated by virtual line in FIG. 16, to profile the depression 105a without fail. To the contrary, in the present embodiment, since the diameter of the profiling roller 119 can be reduced, it is possible to correspond to the small curvature of the depression 105a without fail, thus a predetermined chamfering can be carried out.

Finally, the thickness of the profiling roller 119 can also be reduced, since the balls used for the bearing mechanism as above are no longer required. Therefore it is possible to sufficiently cope with the work piece 105 in a thin shape.

(Fourth Embodiment)

A fourth embodiment of the present invention will now be described with reference to FIG. 17. The present embodiment is a variation of structure of attachment of the profiling roller 119 to the horizontal supporting member 117, in which the diameter of the outer periphery 131 of the pivot 121 of the horizontal supporting member 117 becomes wider toward the upper part. There is an engagement hole 133 in the profiling roller 119 which is engaged with the pivot 121, and the inner diameter of the engagement hole 133 becomes smaller toward the lower part thereof. A minimum diameter (D1) of the engagement hole 133 is designed as being larger by a predetermined amount than a maximum diameter (D2) of an outer periphery 131 of the pivot 121.

Figure 17:
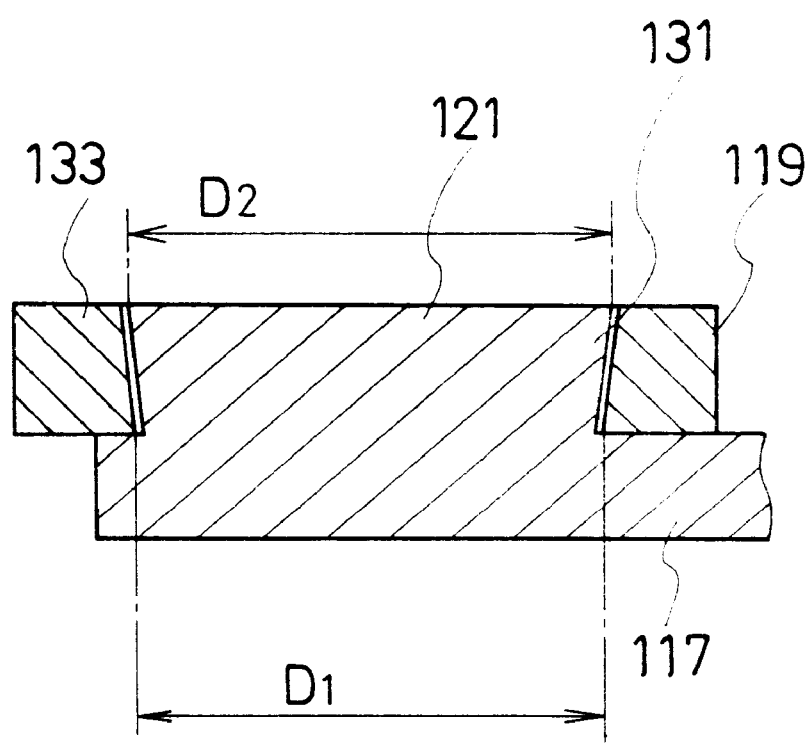
FIG. 17 is a sectional view showing a structure of a profiling apparatus according to a fourth embodiment of the present invention.

In the above structure, when the profiling roller 119 becomes in contact with the rotating work piece 105, a force is applied to the profiling roller 119 toward the right of FIG. 17, and the work piece 105 rotates in such a state. Therefore the detachment of the profiling roller 119 in the upward direction is surely prohibited.

Accordingly, in the present embodiment, the attachment structure of the profiling roller 119 becomes much simplified, and the remarkable facile attachment and detachment of the profiling roller 119 may be accomplished without requiring the tool.

(Fifth Embodiment)

Figure 18:
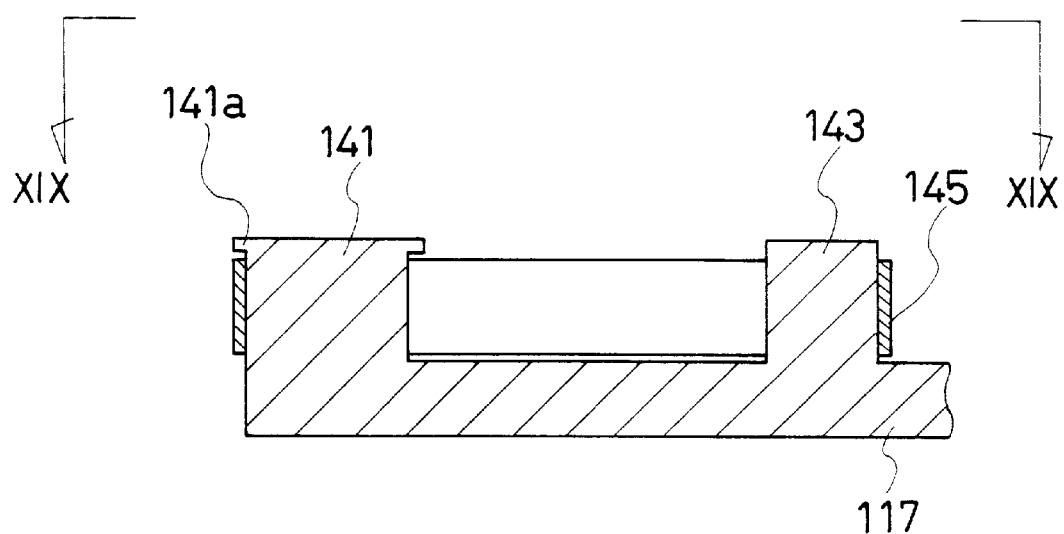
FIG. 18 is a sectional view showing a structure of a profiling apparatus according to a fifth embodiment of the present invention.
Figure 19:
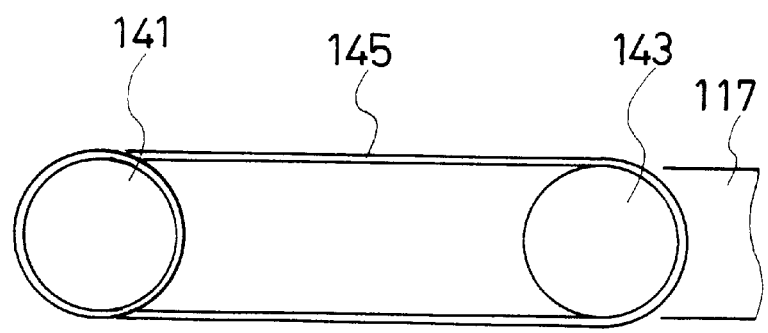
FIG. 19 is a view as viewed from a line between arrows XIX—XIX in FIG. 18 according to the fifth embodiment of the present invention.

A fifth embodiment of the present invention will now be described with reference to FIGS. 18 and 19. The end of the horizontal supporting member 117 is provided with protrusive pivots 141 and 143 with having a predetermined space between them. A profiling belt 145 as a profiling member goes around between the pivots 141 and 143. In such a structure, the same function and effect as the foregoing embodiments can be obtained.

In the present embodiment, it is preferable that the coefficient of friction between the work piece 105 and the profiling belt 145 may become larger than the coefficient of friction between the work piece 105 and the pivots 141, 143. From this point of view, for example, the pivots 141 and 143 may be made of resin such as Teflon (a registered trademark).

The present invention is not limited to the embodiment as described above.

Firstly, although the above embodiments are all referred to the case of chamfering, the same function can be accomplished for other various working or machining.

In the first embodiment of the present invention, the variation of contour of the work piece is detected both in horizontal and perpendicular directions, thus the tool moves in order to profile such a variation. To the contrary, in the second through fifth embodiments, the variation is only detected in horizontal direction. However, an arbitrary decision can be made in which direction the detection should be carried out. Namely, when the thickness of the work piece will not vary, it is sufficient to profile only in the horizontal direction, and when only the thickness of the work piece varies, it is sufficient to profile only in perpendicular direction.

Further, the rotation of the profiling member may be prohibited. For example, if the profiling member is made of hard metal having less amount of abrasion to be in slidable contact with the work piece 105, the profiling member can be pressingly in contact with the work piece 105 in a state that the rotation thereof is prohibited.

What is claimed is:

1. A working apparatus comprising:
   a base,
   a work piece supporting and rotating means which is mounted on said base to hold and rotate a work piece,
   a working tool unit which is mounted on said base to hold a working tool to be rotatable and which forwardly and rearwardly moves in a horizontal direction toward said work piece via a slider mechanism,
   a pressing means which presses said working tool unit in said horizontal direction at a constant pressing force toward said work piece,
   a profiling means which is provided on said working tool unit and forwardly and rearwardly moves by profiling an outer periphery of said work piece through being in contact with said work piece in said horizontal direction and thereby moves said working tool unit as a whole in forward and rearward directions, and
   a working tool unit detecting means for maintaining a constant cutting feed speed of said work piece through adjustment of a rotation speed of said work piece by said work piece holding and rotating means based on a signal from said working tool unit detecting means.

2. The working apparatus as claimed in claim 1, wherein said profiling means is a profiling member attached to an end of said working tool and having a common axis therewith.

3. The working apparatus as claimed in claim 1, wherein said profiling means is a rotative profiling roller attached to an end of said working tool an having a common axis therewith.

4. The working apparatus as claimed in claim 1, wherein said profiling means is a bearing attached to an end of said working tool and having a common axis therewith.

5. The working apparatus as claimed in claim 1, wherein said working tool unit is provided with a tool base having a working tool to carry out a predetermined working on said work piece, and said profiling means is independently attached to said tool base apart from said working tool.

6. A profiling apparatus for a working apparatus as claimed in claim 5, further comprising a supporting member elongated from said tool base, and a profiling member attached to an end of said supporting member.

7. The profiling apparatus for a working apparatus as claimed in claim 6, wherein said profiling member is a rotative profiling roller attached to an end of said supporting member.

8. The profiling apparatus for a working apparatus as claimed in claim 6, wherein said profiling member is a bearing attached to an end of said supporting member.

9. The profiling apparatus for a working apparatus as claimed in claim 6, in which said profiling member is a rotative profiling belt in a loop shape attached to an end of said supporting member.

10. A working apparatus comprising:
    a base,
    a work piece supporting and rotating means which is mounted on said base to hold and rotate a work piece,
    a working tool unit which is mounted on said base to hold a working tool to be rotatable and which forwardly and rearwardly moves in a horizontal and perpendicular directions toward said work piece via a slider mechanism,
    a pressing means which presses said working tool unit in said horizontal direction at a constant pressing force toward said work piece, a horizontal profiling means which is provided on said working tool unit and forwardly and rearwardly moves by profiling an outer periphery of said work piece through being in contact with said work piece in said horizontal direction and thereby moves said working tool unit as a whole in horizontal forward and rearward directions, and a perpendicular profiling means which is provided on said working tool unit and forwardly and rearwardly moves by profiling an outer periphery of said work piece through being in contact with said work piece in a perpendicular direction and thereby moves said working tool unit as a whole in perpendicular forward and rearward directions.

11. The working apparatus as claimed in claim 1, wherein said pressing means is a spring-type elastic member.

12. The working apparatus as claimed claim 1, in wherein said pressing means is a weight.

13. A working apparatus comprising:

a base, a work piece supporting and rotating means which is mounted on said base to hold and rotate a work piece, a working tool unit which is mounted on said base to hold a working tool to be rotatable and which forwardly and rearwardly moves in a perpendicular direction toward said work piece via a slider mechanism, a profiling means which is provided on said working tool unit and forwardly and rearwardly moves by profiling an outer periphery of said work piece through being in contact with said work piece in or perpendicular direction and thereby moves said working tool unit as a whole in forward and rearward directions, and a working tool unit detecting means for maintaining a constant cutting feed speed of said work piece through adjustment of a rotation speed of said work piece by said work piece holding and rotating means based on a signal from said working tool unit detecting means.

* * * * *